US011216161B2

(12) United States Patent
Balasubramanian et al.

(10) Patent No.: US 11,216,161 B2
(45) Date of Patent: Jan. 4, 2022

(54) GENERATING PRESENTATIONS BASED UPON ARTICLES

(71) Applicant: Oath Inc., New York, NY (US)

(72) Inventors: Arunkumar Balasubramanian, Sunnyvale, CA (US); Kapil Raj Thadani, New York, NY (US); Andrew Jeremy Crews, Santa Monica, CA (US)

(73) Assignee: VERIZON MEDIA INC., New York, NY (US)

(*) Notice: Subject to any disclaimer, the term of this patent is extended or adjusted under 35 U.S.C. 154(b) by 65 days.

(21) Appl. No.: 16/216,180

(22) Filed: Dec. 11, 2018

(65) Prior Publication Data
US 2020/0183552 A1    Jun. 11, 2020

(51) Int. Cl.
*G06F 3/0484* (2013.01)
*G06F 3/14* (2006.01)
*G06F 40/295* (2020.01)

(52) U.S. Cl.
CPC .......... *G06F 3/0484* (2013.01); *G06F 3/1454* (2013.01); *G06F 40/295* (2020.01)

(58) Field of Classification Search
CPC .... G06F 16/40; G06F 16/4393; G06F 40/103; G06F 40/106; G06F 40/166; G06F 40/186
USPC ........................................ 715/730, 731, 732
See application file for complete search history.

(56) References Cited

U.S. PATENT DOCUMENTS

| | | | |
|---|---|---|---|
| 10,460,023 B1* | 10/2019 | Shriver | G06F 3/0486 |
| 2007/0208751 A1* | 9/2007 | Cowan | G06Q 10/10 |
| 2007/0209004 A1* | 9/2007 | Layard | G09B 5/00 |
| | | | 715/731 |
| 2010/0088605 A1* | 4/2010 | Livshin | G06T 11/60 |
| | | | 715/731 |
| 2010/0169784 A1* | 7/2010 | Weber | G11B 27/034 |
| | | | 715/731 |
| 2011/0181520 A1* | 7/2011 | Boda | G06F 1/1639 |
| | | | 345/173 |

(Continued)

OTHER PUBLICATIONS

Slidemodel, "Upload, View & Embed Presentations with PowerPoint Online Viewer", (Oct. 9, 2014), <URL https://slidemodel.com/upload-view-embed-presentations-with-powerpoint-online-viewer/>, p. 1-7 (Year: 2014).*

*Primary Examiner* — Mong-Shune Chung
(74) *Attorney, Agent, or Firm* — Cooper Legal Group, LLC

(57) ABSTRACT

One or more computing devices, systems, and/or methods for generating presentations based upon articles are presented. For example, an article may be selected from one or more article databases. Content items may be extracted from the article, wherein the content items comprise one or more videos, one or more images and/or one or more social media posts. Text of the article may be analyzed to generate a plurality of text segments. A presentation, comprising a plurality of slides, may be generated based upon the content items and the plurality of text segments. A graphical user interface of a client device may be controlled to display a presentation editing interface comprising a representation of the presentation. One or more inputs, corresponding to one or more edits to the presentation, may be received via the presentation editing interface. An edited presentation may be generated based upon the one or more inputs.

20 Claims, 17 Drawing Sheets

(56) References Cited

U.S. PATENT DOCUMENTS

| | | | | |
|---|---|---|---|---|
| 2012/0124476 A1* | 5/2012 | Chang | .................... | G06Q 10/10 |
| | | | | 715/730 |
| 2012/0227077 A1* | 9/2012 | Spivack | .............. | G06F 16/9535 |
| | | | | 725/110 |
| 2014/0013212 A1* | 1/2014 | Von Haden | ........... | G06F 40/186 |
| | | | | 715/243 |
| 2015/0193495 A1* | 7/2015 | Zhang | ................... | G06F 16/334 |
| | | | | 707/748 |
| 2016/0054898 A1* | 2/2016 | Kotler | ..................... | G06F 40/10 |
| | | | | 715/209 |
| 2016/0124909 A1* | 5/2016 | Basson | ................... | G10L 25/27 |
| | | | | 715/732 |
| 2016/0275187 A1* | 9/2016 | Chowdhury | ....... | H04N 21/8549 |
| 2017/0193685 A1* | 7/2017 | Imbruce | ................ | G06T 13/205 |
| 2017/0262416 A1* | 9/2017 | Rezgui | ................. | G06F 40/103 |
| 2018/0330628 A1* | 11/2018 | Ahn | ........................ | G09B 7/02 |

\* cited by examiner

GENERATING PRESENTATIONS BASED UPON ARTICLES

BACKGROUND

Many services, such as websites, applications, etc. may provide platforms for consuming articles, such as news articles, educational articles, etc. For example, a user may interact with a service. A list of articles may be presented to the user while interacting with the service. The user may be interested in understanding and/or determining a significance of the article. However, it may be difficult and/or it may take a substantial amount of time for the user to consume the article.

SUMMARY

In accordance with the present disclosure, one or more computing devices and/or methods are provided. In an example, a request to generate a presentation may be received. The request may comprise an indication of an article. Content items may be extracted from the article. The content items may comprise one or more videos, one or more images and/or one or more social media posts. Text of the article may be analyzed to generate a plurality of text segments. The presentation, comprising a plurality of slides, may be generated based upon the content items and the plurality of text segments. A first graphical user interface of a first client device may be controlled to display a presentation editing interface comprising a representation of the presentation. One or more inputs, corresponding to one or more edits to the presentation, may be received via the presentation editing interface. An edited presentation may be generated based upon the one or more inputs. A second request to present the edited presentation may be received from a second client device. A second graphical user interface of the second client device may be controlled to display the edited presentation.

In an example, a request to generate a presentation may be received. The request may comprise an indication of an article (e.g., a news article, an educational article, etc.). Content items may be extracted from the article. The content items may comprise one or more videos, one or more images and/or one or more social media posts. Text of the article may be analyzed to generate a plurality of text segments. The presentation, comprising a plurality of slides, may be generated based upon the content items and the plurality of text segments. A second request to present the presentation may be received from a client device. A graphical user interface of the client device may be controlled to display the presentation.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
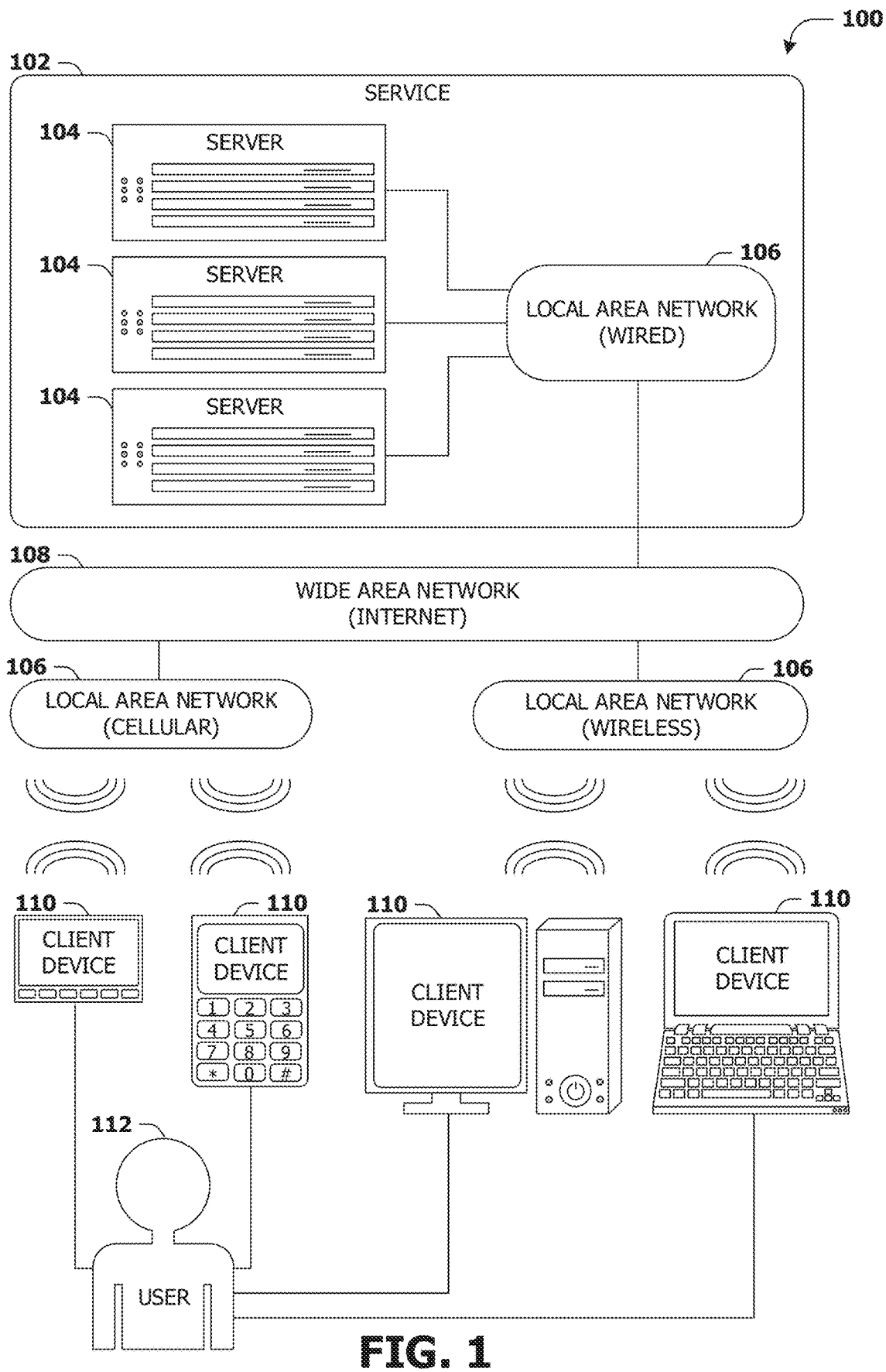
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
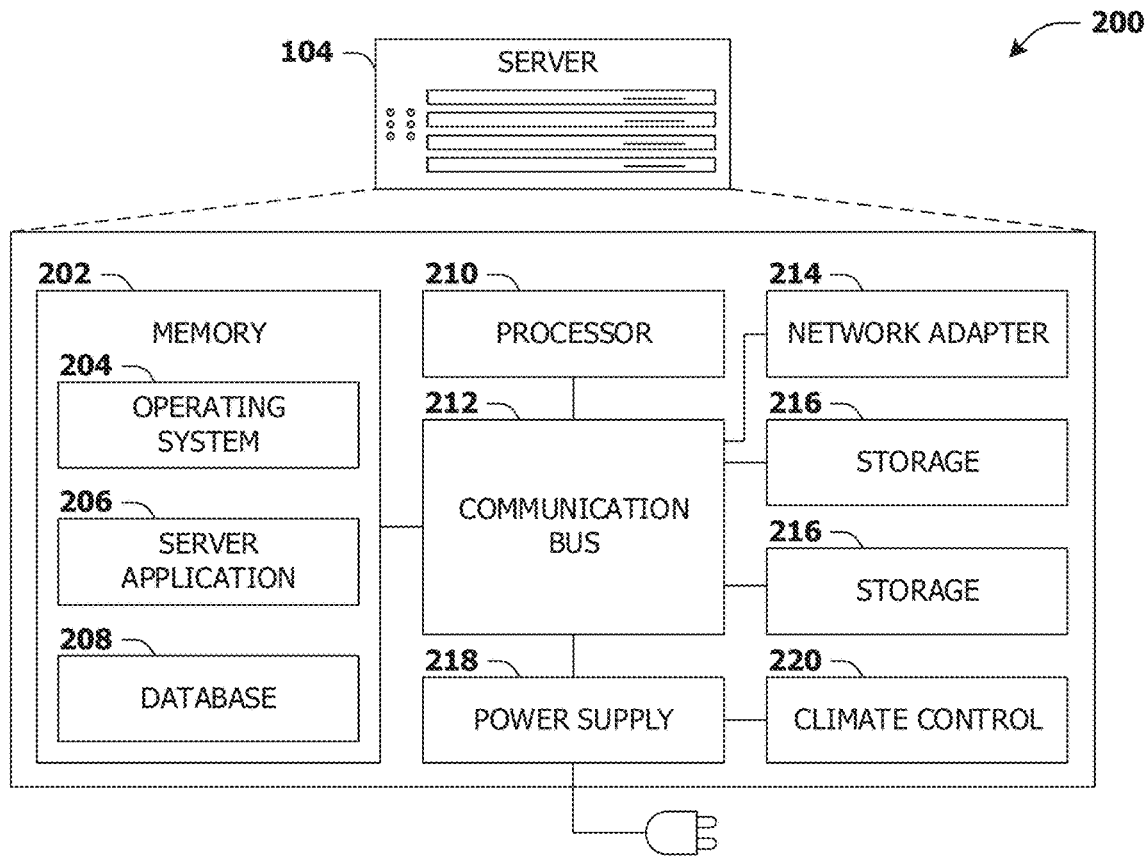
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
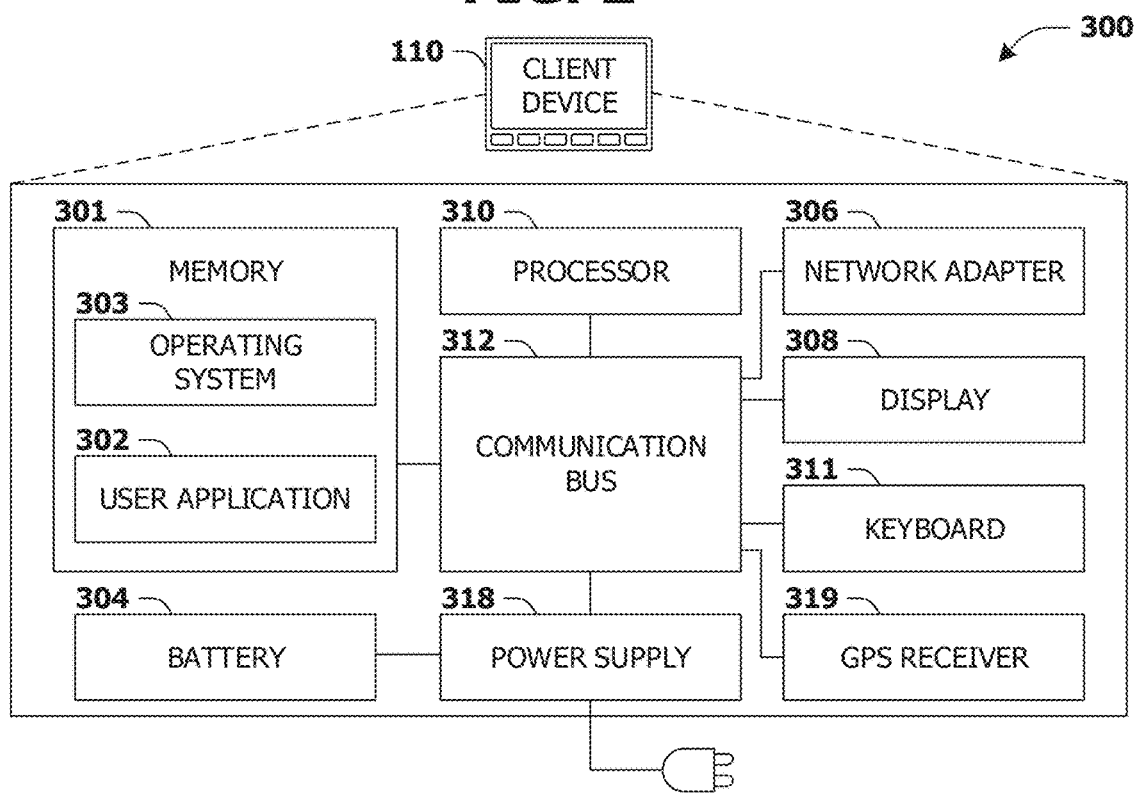
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices, systems, and/or techniques for generating presentations based upon articles are presented. For example, a user (and/or a device associated with the user) may access and/or interact with a service, such as a website, an application, etc. that provides a platform for viewing articles (of the website, the application, etc.). For example, the user may be interested in consuming an article (e.g., a news article, an educational article, etc.). However, the user may (merely) be interested in understanding and/or determining a significance of main points of the article. It may be difficult and/or it may take a substantial amount of time for the user to consume the article to find the main points of the article. Accordingly, the user may be unable to find the main points of the article and/or the user may spend a considerable amount of time finding and/or consuming the main points of the article.

Thus, in accordance with one or more of the techniques presented herein, content items, comprising one or more videos, one or more images and/or one or more social media posts, may be extracted from the article. Text of the article may be analyzed to generate a plurality of text segments. A presentation, comprising a plurality of slides, may be generated based upon the content items and/or the plurality of text segments. The presentation may be edited via a presentation editing software to generate an edited presentation. A graphical user interface of the device (associated with the user) may be controlled to display the edited presentation. The user may be able to conveniently understand main points of the article using the edited presentation without having to consume the article.

Figure 4:
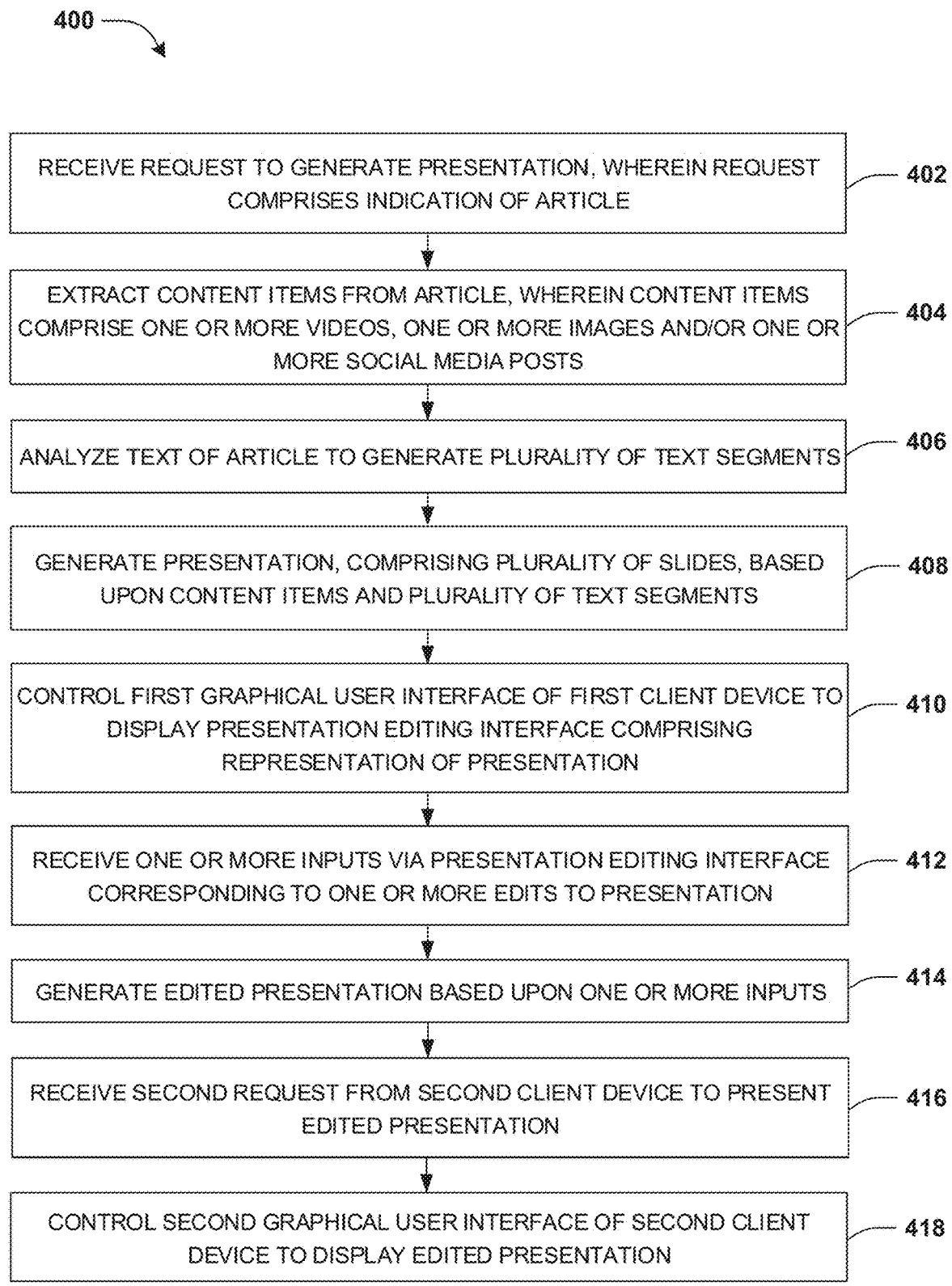
FIG. 4 is a flow chart illustrating an example method for generating presentations based upon articles.

An embodiment of generating presentations based upon articles is illustrated by an example method 400 of FIG. 4. A first user, such as user Jill, and/or a first client device associated with the first user) may access and/or interact with a service, such as a website, an application, etc. that provides a platform for accessing and/or interacting with a presentation interface to identify one or more articles and/or generate one or more presentations based upon the one or more articles.

At 402, a request to generate a presentation may be received from the first client device. The request may comprise an indication of an article. In some examples, the request may be received via the presentation interface. The presentation interface may comprise a first selectable input corresponding to selecting an article. A web address (e.g., a uniform resource locator (URL)) associated with the article may be inputted via the first selectable input. For example, the request may comprise the web address. Alternatively and/or additionally, a file comprising the article may be uploaded to one or more servers associated with the system via the first selectable input. For example, the request may comprise the file.

In some examples, the request may comprise one or more settings associated with the presentation. For example, the presentation interface may comprise one or more first selectable inputs corresponding to the one or more settings. For example, the one or more settings may be inputted via the one or more first selectable inputs. In some examples, the one or more settings may be associated with a maximum time-length of the presentation, a time-length of slides of the presentation, a maximum amount of text associated with the presentation, a presentation template (e.g., selected from a plurality of pre-defined templates and/or created using the presentation interface), one or more colors (e.g., a color scheme, an accent color, etc.) associated with the presentation, a title of the presentation, motion settings associated with the presentation, zooming characteristics associated with the presentation, etc. Alternatively and/or additionally, the one or more settings may be generated based upon the article (e.g., subjects and/or topics associated with the article), one or more past settings associated with one or more other articles previously generated and/or previously published, etc.

In some examples, rather than receiving the request to generate the presentation, the article may be selected (automatically). For example, an amount of activity associated with the article may be determined and/or the amount of activity may be compared with an activity threshold. The amount of activity may correspond to a number of instances of the article being accessed (e.g., by client devices). Alternatively and/or additionally, the amount of activity may correspond to a frequency of instances of the article being accessed (e.g., a number of instances of the article being accessed in an hour, a number of instances of the article being accessed in a day, etc.). For example, a determination may be made that the amount of activity is higher than the activity threshold. Responsive to the determination that the amount of activity is higher than the activity threshold, the article may be selected for generating the presentation based upon the article.

At 404, article content items may be extracted from the article. The article content items may comprise one or more videos of the article, one or more images of the article and/or one or more social media posts of the article. For example, source code (e.g., hypertext markup language (HTML) source code) associated with the web address and/or the article may be analyzed to identify the article content items of the article. In some examples, the article content items may be downloaded and/or stored on the one or more servers.

At 406, article text of the article may be analyzed to generate a plurality of text segments. In some examples, the article text may be analyzed to select a plurality of sets of text from the article text. For example, the article text may be analyzed to determine a plurality of sentence boundaries of the article text. The plurality of sentence boundaries may be determined based upon punctuation marks (e.g., periods and/or other punctuation marks) within the article text, capitalizations of letters within the article text and/or sequences of words within the article text. In some examples, the plurality of sets of text may be selected from the article text based upon the plurality of sentence boundaries. For example, the article text may be divided into the plurality of sets of text based upon the plurality of sentence boundaries. For example, a set of text of the plurality of sets of text may comprise one or more sentences of the article text. Alternatively and/or additionally, a set of text of the plurality of sets of text may comprise a portion of a sentence of the article text.

In some examples, the article text may be analyzed to determine a plurality of entities associated with the article. The plurality of entities (e.g., named entities) may comprise subjects in the article. For example, the plurality of entities may comprise places (e.g., countries, cities, geographic locations, etc.), people (e.g., people of a particular location, people with a particular occupation, politicians, celebrities, socialites, etc.), things (e.g., devices, natural objects, etc.), times (e.g., time periods, dates, etc.), organizations, ideas, systems, events, historical events, current events, abstract objects, physical objects, currencies, etc. In some examples, each set of text of the plurality of sets of text may be associated with a set of entities (e.g., a set of one or more entities) of the plurality of entities. For example, a set of entities may be determined to be associated with a set of text by performing one or more natural language processing techniques (e.g., one or more coreference resolution techniques). Alternatively and/or additionally, the plurality of sets of text may be selected from the article text based upon the plurality of entities.

In some examples, the plurality of sets of text may be analyzed to generate a plurality of representations (e.g., vector representations). Each representation of the plurality of representations may correspond to a set of text of the plurality of sets of text. For example, the plurality of sets of text may be encoded (e.g., mathematically encoded) into the plurality of representations using one or more modeling techniques (e.g., bag-of-words modeling and/or a different modeling technique). For example, each representation of the plurality of representations may comprise a plurality of dimensions associated with a set of text of the plurality of sets of text. For example, each representation of the plurality of representations may comprise indications of information associated with a set of text, such as indications of words, entities, position in the article, similarities to other sets of text, similarities to a title of the article, a measure of salience of the set of text with respect to the article, etc. Alternatively and/or additionally, the plurality of sets of text may be encoded into the plurality of representations using one or more computing systems (e.g., a trained artificial neural network (ANN), an autoencoder, etc.) using one or more architectures (e.g., neural network architectures) and/or training corpora.

A summary of the article text may be generated based upon the plurality of sets of text and/or the plurality of representations. For example, a plurality of scores may be assigned to the plurality of sets of text based upon one or more models (e.g., one or more statistical models) and/or the plurality of representations. For example, each score of the plurality of scores may be assigned to a set of text of the plurality of sets of text based upon a representation of the plurality of representations corresponding to the set of text.

Alternatively and/or additionally, one or more optimization algorithms may be employed to select a second plurality of sets of text from the plurality of sets of text, for inclusion into the summary, based upon the plurality of scores and/or the plurality of representations. In some examples, the second plurality of sets of text may be selected such that an amount of text of the second plurality of sets of text does not exceed a second maximum amount of text of the summary (e.g., the second maximum amount of text of the summary may be determined based upon the maximum amount of text associated with the presentation and/or based upon the article).

Alternatively and/or additionally, the second plurality of sets of text may be selected from the plurality of sets of text in order to maximize a total score associated with the second plurality of sets of text. For example, the total score may correspond to a combination (e.g., addition and/or a different mathematical combination) of a second plurality of scores of the second plurality of sets of text. For example, each score of the second plurality of scores may correspond to a set of text of the second plurality of sets of text. In some examples, the second plurality of sets of text may be selected such that the total score is maximized and/or such that the amount of text of the second plurality of sets of text does not exceed the second maximum amount of text. The total score may be determined to be maximized (using the one or more optimization algorithms) by determining that a ratio of the total score to the amount of text of the second plurality of sets of text is a highest possible ratio. Alternatively and/or additionally, the total score may be determined to be maximized (using the one or more optimization algorithms) by determining that a ratio of the total score to the second maximum amount of text is a highest possible ratio.

Alternatively and/or additionally, sets of text of the second plurality of sets of text may be modified and/or shortened such that the amount of text of the second plurality of sets of text does not exceed the second maximum amount of text. Alternatively and/or additionally, the second plurality of sets of text may be selected from the plurality of sets of text based upon a determination that a second plurality of scores associated with the second plurality of sets of text is higher than a score threshold. In some examples, the score threshold may be configured based upon the second maximum amount of text such that the amount of text of the second plurality of sets of text does not exceed the second maximum amount of text.

Alternatively and/or additionally, one or more second computing systems (e.g., a second trained ANN, a second autoencoder, etc.) may be used to generate a sequence of labels associated with the plurality of sets of text. For example, the sequence of labels may be generated based upon the plurality of representations. In some examples, the one or more computing systems (e.g., the trained ANN and/or the autoencoder) may be trained jointly with the one or more second computing systems (e.g., the second trained ANN and/or the second autoencoder). Alternatively and/or additionally, the one or more computing systems (e.g., the trained ANN and/or the autoencoder) may be trained separately from and/or differently than the one or more second computing systems (e.g., the second trained ANN and/or the second autoencoder). In some examples, the second plurality of sets of text may be selected from the plurality of sets of text for inclusion into the summary based upon the sequence of labels.

In some examples, the summary and/or the second plurality of sets of text may be modified. For example, the summary may be shortened by removing one or more portions of the summary (e.g., by removing one or more portions of text from sets of text of the second plurality of sets of text). In some examples, the summary may be modified using one or more third computing systems (e.g., a third trained ANN, a third autoencoder, etc.) to change orders of words, add words, remove words, change sentence structure, etc. such that the summary may be shorter and/or more understandable. For example, sets of text of the second plurality of sets of text may be modified using the one or more third computing systems, to change orders of words, add words, remove words, change sentence structure, etc. such that the sets of text of the second plurality of sets of text may be shorter and/or more understandable.

In some examples, the one or more computing systems (e.g., the trained ANN and/or the autoencoder) and/or the one or more second computing systems (e.g., the second trained ANN and/or the second autoencoder) may be trained jointly with the one or more third computing systems (e.g., the third trained ANN and/or the third autoencoder). Alternatively and/or additionally, the one or more computing systems (e.g., the trained ANN and/or the autoencoder) and/or the one or more second computing systems (e.g., the second trained ANN and/or the second autoencoder) may be trained separately from and/or differently than the one or more third computing systems (e.g., the third trained ANN and/or the third autoencoder).

In some examples, the plurality of text segments may be generated by separating the summary into the plurality of text segments. Alternatively and/or additionally, each text segment of the plurality of text segments may comprise one or more sets of text of the second plurality of sets of text (comprised within the summary). Alternatively and/or additionally, each text segment of the plurality of text segments may comprise one or more indications of a set of entities associated with the text segment (e.g., the set of entities may be determined based upon the plurality of representations, the plurality of sets of text and/or the second plurality of sets of text and/or may be determined using one or more coreference resolution techniques).

At 408, the presentation may be generated based upon the article content items and/or the plurality of text segments. For example, the presentation may comprise a plurality of slides. In some examples, slides the plurality of slides may comprise text segments of the plurality of text segments and/or content items of the article content items.

In some examples, a first slide of the presentation may comprise a first text segment of the plurality of text segments. Alternatively and/or additionally, the first slide may comprise a first content item. For example, the first content item may be a first image and/or a first video. For example, a first set of entities associated with the first text segment may be determined (e.g., based upon one or more indications of the first set of entities within the first text segment, within the second plurality of sets of text, etc. and/or by using one or more coreference resolution techniques). Information associated with the article content items (e.g., captions associated with the article content items, descriptions of the article content items comprised within the article text, etc.) may be analyzed to select the first content item from the article content items for inclusion into the first slide based upon a determination that the first content item is associated with the first set of entities.

Alternatively and/or additionally, one or more image analysis techniques (e.g., one or more facial recognition techniques and/or one or more location recognition techniques) may be performed to determine entities associated with one or more content items of the article content items. For example, using the one or more image analysis techniques, it may be determined that the first content item is associated with the first set of entities (e.g., the first content item may comprise one or more representations of the first set of entities that may be detected using the one or more facial recognition techniques and/or the one or more location recognition techniques). The first content item may be selected from the article content items for inclusion into the first slide based upon a determination that the first content item comprises one or more representations of the first set of entities.

Alternatively and/or additionally, the first content item may not be identified from the article content items. For example, responsive to a determination that a content item associated with the first set of entities is not available within the article content items (e.g., a determination that the article content items do not comprise a content item associated with the first set of entities, a determination that the article content items comprise one or more content items associated with the first set of entities that are used by one or more different slides of the presentation, etc.), a content items database may be analyzed to identify the first content item.

In some examples, the content items database may comprise a plurality of images associated with a plurality of news articles. Each image of the plurality of images may be linked with an identifier corresponding to one or more entities associated with the image. Alternatively and/or additionally, the content items database may comprise a plurality of videos associated with a plurality of news articles. Each video of the plurality of videos may be linked with an identifier corresponding to one or more entities associated with the video. Alternatively and/or additionally, the content items database may comprise a second plurality of images associated with one or more services (e.g., a data collection service, a stock image service, a news service, etc.). Each image of the second plurality of images may be linked with an identifier corresponding to one or more entities associated with the image. Alternatively and/or additionally, the content items database may comprise a second plurality of videos associated with one or more services (e.g., a data collection service, a stock video service, a news service, etc.). Each video of the second plurality of videos may be linked with an identifier corresponding to one or more entities associated with the video.

For example, a first set of content items, comprising the first content item, may be extracted from the content items database based upon an association of the first set of content items with the first set of entities. The first content item may be selected from the first set of content items based upon a time associated with the first content item (e.g., the first content item may be associated with a publishing time more current than other content items of the first set of content items). Alternatively and/or additionally, the first content item may be selected from the first set of content items for inclusion into the first slide using one or more models (e.g., one or more statistical models).

In some examples, a second slide of the presentation may comprise a second text segment of the plurality of text segments. Alternatively and/or additionally, the second slide may comprise a second content item. The second content item may comprise a second image and/or a second video. The second text segment may comprise a quote. A second entity associated with the quote may be determined (e.g., based upon one or more indications of the second set of entities within the second text segment, within the second plurality of sets of text, etc. and/or by using one or more coreference resolution techniques). For example, the second entity may be determined by analyzing the article text and/or analyzing the second text segment.

In some examples, the second entity may be a person and/or an organization associated with the quote (e.g., a person that issued a statement comprising the quote, an organization that issued a statement comprising the quote, a person that stated the quote, an organization associated with a person that stated the quote, a person that wrote a statement comprising the quote, an organization associated with a person that wrote a statement comprising the quote, etc.). In some examples, information associated with the article content items may be analyzed to select the second content item from the article content items for inclusion into the second slide based upon a determination that the second content item is associated with the second entity. Alternatively and/or additionally, responsive to a determination that a content item associated with the second entity is not available within the article content items, the content items database may be analyzed to select the second content item for inclusion into the second slide from the content items database.

Alternatively and/or additionally, a video associated with the quote may be identified. For example, the video may comprise a representation of the second entity stating the quote. The video may be comprised within the article content items. Alternatively and/or additionally, the video may be extracted from the content items database. In some examples, a transcript associated with the video may be determined (e.g., the transcript may be retrieved from the content items database, the transcript may be retrieved from within the video, the video may be transcribed to generate the transcript using speech recognition techniques and/or other techniques, etc.). In some examples, the transcript may comprise transcription text representative of spoken words and/or sounds of the video.

The transcript may be analyzed to identify a timespan of the video corresponding to the quote. For example, the timespan may correspond to a video segment of the video wherein the quote is spoken by the second entity. The video segment of the video may be extracted based upon the timespan. The second slide may comprise a representation of the quote and/or a representation of the video segment. Alternatively and/or additionally, the second slide may comprise an indication that the second text segment comprises a quote and/or a representation of a name of the second entity.

In some examples, the article content items may comprise a social media post. For example, a type of the social media post may be determined. In some examples, the type of the social media post may be associated with a social media platform of the social media post. In some examples, the social media post may be formatted based upon the type of social media post to generate a formatted version of the social media post. For example, the formatted version of the social media post may comprise a symbol (e.g., a logo, an image, etc.) associated with the social media platform. A third slide may be generated comprising the formatted version of the social media post.

Alternatively and/or additionally, the third slide may comprise a third content item. For example, responsive to a determination that the social media post does not comprise an image and/or a video, the third slide may be generated comprising the third content item. The third content item may comprise a third image and/or a third video. A third entity associated with the social media post may be determined. For example, the third entity may be determined analyzing the social media post (e.g., the social media post may comprise an indication of a user account associated with the third entity and/or an indication of a name of the third entity). For example, the third entity may be a person and/or an organization associated with the social media post (e.g., a person that posted the social media post using the social media platform, an organization that posted the social media post using the social media platform, etc.).

Alternatively and/or additionally, the third entity may be a person, an organization and/or a user account mentioned in the social media post (e.g., the social media post may comprise an indication of the third entity). Alternatively and/or additionally, the third entity may be a person and/or an organization linked by the social media post. For example, the social media post may comprise a link to a webpage and/or a user account associated with the third entity. Alternatively and/or additionally, the third entity may be a person and/or an organization tagged by the social media post. For example, the social media post may comprise a tag (e.g., hashtag, "#", etc.) and/or an indication of a webpage, a user account and/or a name of the third entity.

In some examples, information associated with the article content items may be analyzed to select the third content item from the article content items for inclusion into the third slide based upon a determination that the third content item is associated with the third entity. Alternatively and/or additionally, responsive to a determination that a content item associated with the third entity is not available within the article content items, the content items database may be analyzed to select the third content item from the content items database for inclusion into the third slide.

At 410, a first graphical user interface of the first client device may be controlled to display a presentation editing interface comprising a representation of the presentation. For example, the presentation editing interface may display a representation of the article and/or one or more representations of sections of the article text incorporated in the presentation. Alternatively and/or additionally, the representation of the article may comprise a plurality of indications of a plurality of sections of the article text associated with the plurality of slides. For example, the representation of the article may comprise an indication of subject matter of a first section of the article text being incorporated into a fourth slide of the plurality of slides, an indication of subject matter of a second section of the article text being incorporated into a fifth slide of the plurality of slides, etc. Alternatively and/or additionally, the representation of the article may comprise one or more indications of one or more content items of the article content items associated with the plurality of slides. For example, the representation of the article may comprise an indication of a fourth content item of the article content items being incorporated into a sixth slide of the plurality of slides, an indication of a fifth content item of the article content items being incorporated into a seventh slide of the plurality of slides, etc.

At 412, one or more inputs corresponding to one or more edits to the presentation may be received via the presentation editing interface. For example, the presentation editing interface may comprise a plurality of selectable inputs corresponding to the plurality of slides. For example, each slide of the plurality of slides may be associated with a set of selectable inputs (e.g., a set of one or more selectable inputs) of the plurality of selectable inputs.

In some examples, the plurality of slides may be organized and/or an order (e.g., arrangement) of the plurality of slides may be changed using the presentation editing interface. Alternatively and/or additionally, one or more slides of the plurality of slides may be removed using the presentation editing interface. Alternatively and/or additionally, one or more text segments associated with one or more slides may be modified (e.g., one or more words may be added to a text segment of a slide, one or more words may be removed from a text segment of a slide, one or more words of a text segment of a slide may be modified, etc.). Alternatively and/or additionally, one or more content items associated with one or more slides may be removed and/or modified (e.g., a content item may be added to a slide, a content item may be removed from a slide, a content item of a slide may be modified, etc.).

In some examples, the presentation editing interface may display a representation of an eighth slide and/or a first set of selectable inputs associated with the eighth slide. For example, the first set of selectable inputs may comprise a first text area corresponding to an eighth text segment associated with the eighth slide. For example, the eighth text segment may be modified using the first text area. Alternatively and/or additionally, the first set of selectable inputs may comprise one or more second selectable inputs corresponding to a layout (e.g., a title layout corresponding to a title slide, a text layout corresponding to a slide comprising a text segment, a quotation layout corresponding to a slide comprising a quote, one or more social medial layouts corresponding to one or more types of social media posts, etc.) of the eighth slide. In some examples, the layout may be configured (automatically) based upon contents of the eighth slide. In some examples, the layout may be switched using the one or more second selectable inputs. For example, responsive to a selection of a new layout using the one or more second selectable inputs that is different than an automatically selected layout of the eighth slide, the new layout may be applied to generate the eighth slide (e.g., the eighth slide may be formatted based upon the new layout).

Alternatively and/or additionally, the first set of selectable inputs may comprise a third selectable input corresponding to an eighth content item associated with the eighth slide. For example, the third selectable input may comprise an indication of the eighth content item and/or a source associated with the eighth content item (e.g., the source may correspond to a source of data from which the eighth content item was retrieved). Alternatively and/or additionally, the eighth content item may be removed from the eighth slide using the third selectable input and/or a ninth content item may be added to the eighth slide using the third selectable input.

Alternatively and/or additionally, the first set of selectable inputs may comprise a fourth selectable input corresponding to one or more zooming characteristics associated with the eighth slide. For example, the one or more zooming characteristics may be associated with a defined level of magnification of the eighth content item of the eighth slide. In some examples, while the eighth slide is presented on a client device, a level of magnification of the eighth content item may increase until the defined level of magnification is reached. In some examples, the one or more zooming characteristics may be configured (automatically) based upon one or more characteristics of the eighth content item (e.g., merely a portion of the eighth content item may comprise one or more entities associated with the eighth text segment such that the defined level of magnification may highlight the portion of the eighth content item that comprises the one or more entities, wherein the portion of the eighth content item may be identified using one or more image analysis techniques, such as one or more facial recognition techniques). In some examples, the one or more zooming characteristics may be modified using the fourth selectable input.

Alternatively and/or additionally, the first set of selectable inputs may comprise a fifth selectable input corresponding to a duration of the eighth slide. For example, the duration of the eighth slide may be associated with a length of time that the eighth slide may be displayed on a client device (e.g., after the length of time, a ninth slide may automatically be displayed, in place of the eighth slide). In some examples, the duration of the eighth slide may be configured (automatically) based upon a number of words associated with the eighth text segment and/or a significance of the eighth content item. In some examples, the duration of the eighth slide may be modified using the fifth selectable input.

Alternatively and/or additionally, the first set of selectable inputs may comprise a sixth selectable input corresponding to a text duration associated with the eighth slide. For example, the text duration of the eighth slide may be associated with a timespan of the duration of the eighth slide that the eighth text segment is displayed (e.g., the timespan may indicate that the eighth text segment is displayed one second after the eighth slide is displayed until one second before the eighth slide stops being displayed). In some examples, the text duration of the eighth slide may be configured (automatically) based upon the number of words associated with the eighth text segment. In some examples, the text duration of the eighth slide may be modified using the sixth selectable input.

In some examples, a second plurality of slides, associated with the eighth slide, may be generated. The second plurality of slides may be ranked using one or more techniques (e.g., image analysis techniques, machine learning techniques, etc.). The eighth slide may be selected from the second plurality of slides for inclusion into the plurality of slides based upon a ranking of the eighth slide. Alternatively and/or additionally, one or more slides may be selected from the second plurality of slides (based upon one or more rankings of the one or more slides) as one or more alternative versions of the eighth slide.

For example, an alternative version of the one or more alternative versions of the eighth slide may comprise a content item different than the eighth content item, a text segment different than the eighth text segment, a layout different than a layout of the eighth slide, a format different than a format of the eighth slide, one or more colors (e.g., a color scheme, an accent color) different than one or more colors (e.g., a color scheme, an accent color) of the eighth slide, etc. The first set of selectable inputs may comprise one or more seventh selectable inputs corresponding to the one or more alternative versions of the eighth slide. For example, an alternative version of the one or more alternative versions may be selected to replace the eighth slide using the one or more seventh selectable inputs.

Alternatively and/or additionally, the first set of selectable inputs may comprise one or more eighth selectable inputs corresponding to one or more motion settings of the eighth slide. For example, the one or more eighth selectable inputs may be associated with two or more parts of the eighth content item. In some examples, while the eighth slide is presented on a client device, a representation of the eighth content item may be displayed. Initially, the representation of the eighth content item may comprise a first part of the two or more parts of the eighth content item. The representation of the eighth content item may move (e.g., gradually move, smoothly move, etc.) from the first part of the two or more parts of the eighth content item to a second part of the two or more parts of the eighth content item. In some examples, the one or more motion settings may be configured (automatically) based upon a determination that each part of the two or more parts of the eighth content item comprises an entity of the one or more entities associated with the eighth content item (e.g., using one or more image analysis techniques). In some examples, the one or more motion settings may be modified using the one or more eighth selectable inputs.

In an example, the eighth content item may have an image aspect ratio that is different than a device aspect ratio of a client device. For example, the eighth content item may comprise a 4:3 image (e.g., a landscape image) and/or the client device may comprise a 9:16 screen (e.g., a portrait screen). For example, the 4:3 image may be representative of a first political figure socializing with a second political figure. While the eighth slide is presented on the client device, a representation of the eighth content item may be displayed such that the representation of the eighth content item may move (e.g., gradually move, smoothly move, etc.) from the first part of the eighth content item (e.g., the first part of the eighth content item may comprise a representation of the first political figure) to the second part of the eighth content item (e.g., the second part of the eighth content item may comprise a representation of the second political figure).

Alternatively and/or additionally, the first set of selectable inputs may comprise one or more ninth selectable inputs corresponding to one or more format settings associated with the eighth slide. For example, the one or more format settings may correspond to a position of the eighth text segment and/or a position of the eighth content item. In some examples, the one or more format settings may be configured such that the eighth text segment is underneath the eighth content item. Alternatively and/or additionally, the one or more format settings may be configured such that the eighth text segment is overlaid onto a portion (e.g., a bottom portion, a middle portion, a top portion, etc.) of the eighth content item. Alternatively and/or additionally, the one or more format settings may be configured such that the eighth slide does not comprise the eighth content item. Alternatively and/or additionally, the one or more format settings may correspond to a position of a text portion of an eighth social media post associated with the eight slide and/or a position of a content item of the eighth social media post. In some examples, the one or more format settings may be configured (automatically) based upon the number of words associated with the eighth text segment and/or one or more characteristics of the eighth content item. In some examples, the one or more format settings may be modified using the one or more ninth selectable inputs.

In some examples, the plurality of selectable inputs of the presentation editing interface may comprise a second set of selectable inputs associated with one or more audio settings of the presentation. For example, the one or more audio settings may correspond to one or more audio files that may be outputted using a speaker of a client device while the presentation is being presented on the client device. For example, the one or more audio settings may correspond to a first audio file corresponding to one or more slides of the presentation (e.g., the first audio file may be outputted while merely a portion of the presentation is presented and/or the first audio file may be outputted while every slide of the presentation is presented). In some examples, the one or more audio settings may be configured (automatically) based upon a subject and/or a topic associated with the article (e.g., an upbeat audio file may be selected for a sports article, an ambient audio file may be selected for a health article, etc.). In some examples, the one or more audio settings may be modified ad/or a second audio file may be selected for the presentation using the second set of selectable inputs.

In some examples, the plurality of selectable inputs of the presentation editing interface may comprise a third set of selectable inputs associated with presentation settings associated with the presentation. For example, the third set of selectable inputs may comprise one or more tenth selectable inputs corresponding to a project title associated with the presentation. For example, the project title may be modified using the one or more tenth selectable inputs. Alternatively and/or additionally, the third set of selectable inputs may comprise one or more eleventh selectable inputs corresponding to a project description associated with the presentation. For example, the project description may be modified using the one or more eleventh selectable inputs.

Alternatively and/or additionally, the third set of selectable inputs may comprise one or more twelfth selectable inputs corresponding to one or more template settings associated with the presentation. For example, the one or more template settings may be associated with a presentation template associated with the presentation. In some examples, each selectable input of the one or more twelfth selectable inputs may correspond to a template of a plurality of templates. In some examples, one or more templates of the plurality of templates may be associated with one or more news companies. Alternatively and/or additionally, one or more templates of the plurality of templates may be associated with one or more topics and/or subjects (e.g., politics, health, sports, etc.). In some examples, the one or more template settings may be configured (automatically) and/or the presentation template may be selected (automatically) based upon a news company associated with the article and/or a topic associated with the article. In some examples, the one or more template settings may be modified and/or a second presentation template may be selected from the plurality of templates using the one or more twelfth selectable inputs.

In some examples, the third set of selectable inputs may comprise one or more thirteenth selectable inputs corresponding to one or more aspect ratio settings associated with the presentation. For example, the one or more aspect ratio settings may be associated with one or more aspect ratios supported by the presentation. In some examples, the one or more aspect ratios may be selected automatically. For example, one or more versions of the presentation may be generated based upon the one or more aspect ratios. For example, each version of the one or more versions of the presentation may correspond to an aspect ratio of the one or more aspect ratios. In some examples, the one or more aspect ratio settings may be modified using the one or more thirteenth selectable inputs.

Alternatively and/or additionally, responsive to a selection of a selectable input of the one or more thirteenth selectable inputs corresponding to a first aspect ratio of the one or more aspect ratios, the presentation editing interface may display a second plurality of selectable inputs associated with a first version of the presentation having the first aspect ratio. For example, one or more slides, one or more text segments, one or more content items, one or more motion settings, one or more colors, etc. associated with the first version of the presentation may be modified using the second plurality of selectable inputs.

Alternatively and/or additionally, the third set of selectable inputs may comprise one or more fourteenth selectable inputs corresponding to one or more color settings associated with the presentation. For example, the one or more color settings may be associated with one or more colors, one or more color schemes, one or more accent colors, etc. associated with one or more content items of the presentation, one or more slides of the presentation, one or more slide backgrounds of the presentation, etc. In some examples, the one or more color settings may be modified using the one or more fourteenth selectable inputs.

Alternatively and/or additionally, the third set of selectable inputs may comprise one or more fifteenth selectable inputs corresponding to one or more time settings associated with the presentation. For example, the one or time settings may be associated with a maximum time-length of the presentation. In some examples, the one or more time settings may be configured (automatically) based upon a length of the article and/or a number of content items of the article content items of the article. Alternatively and/or additionally, the one or more time settings may be modified using the one or more fifteenth selectable inputs. In some examples, responsive to a modification of the maximum time-length of the presentation, time durations of slides of the plurality of slides may be modified based upon the maximum time-length of the presentation.

At 414, an edited presentation may be generated based upon the one or more inputs (received via the presentation editing interface). In some examples, the presentation editing interface may comprise a third plurality of selectable inputs associated with a file format of the edited presentation. Alternatively and/or additionally, the presentation editing interface may comprise a sixteenth selectable input corresponding to publishing the edited presentation. For example, responsive to receiving a selection of the sixteenth selectable input, the third plurality of selectable inputs may be displayed by the presentation editing interface. For example, the third plurality of selectable inputs may comprise a seventeenth selectable input corresponding to a video file format and/or an eighteenth selectable input corresponding to a web interface file format (e.g., an HTML file and/or a different web interface file format).

For example, responsive to a selection of the seventeenth selectable input, a presentation video file comprising a representation of the edited presentation may be generated. Alternatively and/or additionally, responsive to a selection of the eighteenth selectable input, a presentation interface file comprising a representation of the edited presentation may be generated. Alternatively and/or additionally, the presentation video file and the presentation interface file may (both) be generated. For example, a file may be chosen from the presentation video file and the presentation interface file based upon capabilities of a client device.

In some examples, an edited presentation file (comprising the presentation video file and/or the presentation interface file) may be uploaded to one or more second servers associated with a second service that provides a content interface for accessing and/or interacting with articles (e.g., news articles, educational articles, etc.) and/or presentations (e.g., presentations associated with the news articles, presentations associated with the educational articles, etc.).

At 416, a second request may be received from a second client device to present the edited presentation. The second request may be received via the content interface. For example, a second graphical user interface of the second client device may be controlled to display the content interface. For example, the content interface may display a list of articles comprising the article and/or a list of presentations comprising the edited presentation. In some examples, the second request may be received via a selection of the edited presentation from the list of presentations. Alternatively and/or additionally, the second request may be received via a selection of the article from the list of articles.

At 418, the second graphical user interface of the second client device may be controlled to display the edited presentation. For example, the second graphical user interface of the second client device may be controlled to display the edited presentation responsive to receiving the second request. In some examples, a device aspect ratio associated with the second client device (e.g., an aspect ratio of a screen of the second client device) may be determined. For example, the device aspect ratio may be determined based upon an identification number received from the second client device (e.g., the identification number may be comprised within the second request and/or a different communication).

In some examples, the second graphical user interface of the second client device may be controlled to display the edited presentation based upon the device aspect ratio. For example, a version of the edited presentation file corresponding to the device aspect ratio may be selected for presentation of the edited presentation from a plurality of versions of the edited presentation file corresponding to a plurality of device aspect ratios.

In some examples, the edited presentation may be displayed by presenting a representation the presentation video file using the second client device. Alternatively and/or additionally, the edited presentation may be displayed by presenting a representation of the presentation interface file using the second client device. For example, an interactive presentation interface may be displayed comprising the representation of the presentation video file and/or the representation of the presentation interface file. In some examples, the interactive presentation interface may be interactive (e.g., actions associated with the edited presentation may be performed responsive to inputs received via the interactive presentation interface).

For example, responsive to receiving a first input via the representation of the presentation interface file (e.g., while the edited presentation is displayed), the second graphical user interface of the second client device may be controlled to display a next slide of the edited presentation. For example, if the first input is received while a tenth slide of the edited presentation is displayed, an eleventh slide may be displayed in place of the tenth slide. For example, the first input may comprise pushing a first button (e.g., a forward button), sliding a touchscreen of the second client device in a first direction (e.g., left-to-right direction), etc.

Alternatively and/or additionally, responsive to receiving a second input via the representation of the presentation interface file (e.g., while the edited presentation is displayed), the second graphical user interface may be controlled to display a previous slide of the edited presentation. For example, if the first input is received while the eleventh slide is displayed, the tenth slide may be displayed in place of the eleventh slide. For example, the second input may comprise pushing a second button (e.g., a backward button), sliding the touchscreen in a second direction (e.g., right-to-left direction), etc.

In some examples, responsive to receiving a third input via the representation of the presentation interface file (while the edited presentation is displayed), the second graphical user interface may be controlled to display the article. For example, the third input may comprise pushing a third button (e.g., a downward button, an upward button), sliding the touchscreen in a third direction (e.g., up direction, down direction, etc.), etc.

In some examples, responsive to receiving a fourth input via the representation of the presentation interface file (while the edited presentation is displayed), the second graphical user interface may be controlled to display a second presentation associated with a second article. In some examples, the presentation and/or the second presentation may be comprised within a second list of presentations. For example, presentations of the second list of presentations may be associated with a common subject and/or topic (e.g., sports, politics, etc.), etc. Alternatively and/or additionally, presentations of the second list of presentations may be ordered based upon times of the presentations (e.g., most recent to least recent). In some examples, the fourth input may comprise pushing the first button two or more times consecutively, pushing a fourth button, sliding the touchscreen in the first direction, sliding the touchscreen in a third direction, etc.

In some examples, the presentation may be compared with the edited presentation to generate an editing report comprising one or more indications of one or more differences between the presentation and the edited presentation. For example, the presentation may be stored on the one or more servers (prior to any edits to the presentation using the presentation editing interface). Alternatively and/or additionally, the edited presentation may be stored on the one or more servers responsive to receiving the one or more inputs (and/or responsive to the edited presentation being published). Alternatively and/or additionally, the editing report may comprise one or more indications of one or more relationships and/or one or more comparisons between the edited presentation and the article (e.g., indications of portions of the article text incorporated into the edited presentation).

The editing report may be used to generate presentations associated with articles. For example, a third request to generate a third presentation may be received. The third request may comprise an indication of a second article. Second content items (e.g., one or more videos, one or more images and/or one or more social media posts) may be extracted from the second article. Alternatively and/or additionally, second text of the second article may be analyzed to generate a second plurality of text segments based upon the editing report using one or more techniques (e.g., machine learning techniques).

For example, the one or more computing systems (used to encode the plurality of sets of text into the plurality of representations), the one or more second computing systems (used to generate the sequence of labels associated with the plurality of sets of text) and/or the one or more third computing systems (used to modify the summary) may be trained based upon the editing report. For example, one or more architectures (e.g., neural network architectures) and/or training corpora associated with the one or more computing systems, the one or more second computing systems and/or the one or more third computing systems may be modified (e.g., updated) based upon the editing report to generate one or more modified architectures and/or one or more modified training corpora. Thus, architectures and/or training corpora may progressively be refined. The one or more modified architectures and/or the one or more modified training corpora of the one or more computing systems, the one or more second computing systems and/or the one or more third computing systems may be used to extract the second content items from the second article, generate the second plurality of text segments and/or generate the third presentation. Alternatively and/or additionally, the third presentation, comprising a third plurality of slides, may be generated based upon the second content items, the second plurality of text segments and/or the editing report.

In some examples, rather than presenting the presentation editing interface for editing the third presentation, responsive to generating the third presentation, a second presentation file associated with the third presentation may be uploaded to the one or more second servers (associated with the second service). For example, the second presentation file (and/or the third presentation) may be accessed and/or interacted with using the content interface. Alternatively and/or additionally, the presentation editing interface may be displayed comprising a representation of the third presentation. For example, one or more second inputs associated with edits to the third presentation may be received via the presentation editing interface. A second edited presentation may be generated based upon the one or more second inputs. A third presentation file associated with the second edited presentation may be uploaded to the one or more second servers. The third presentation file (and/or the second edited presentation) may be accessed and/or interacted with using the content interface.

FIGS. 5A-5M illustrate examples of a system 501 for generating presentations based upon articles. A first user, such as user James (and/or a first device 500 associated with the first user) may access and/or interact with a service, such as a website, an application, etc. that provides a platform for accessing and/or interacting with a presentation interface to identify one or more articles and/or generate one or more presentations based upon the one or more articles. For example, a first graphical user interface of the first device 500 may be controlled to display a presentation interface.

Figure 5A:
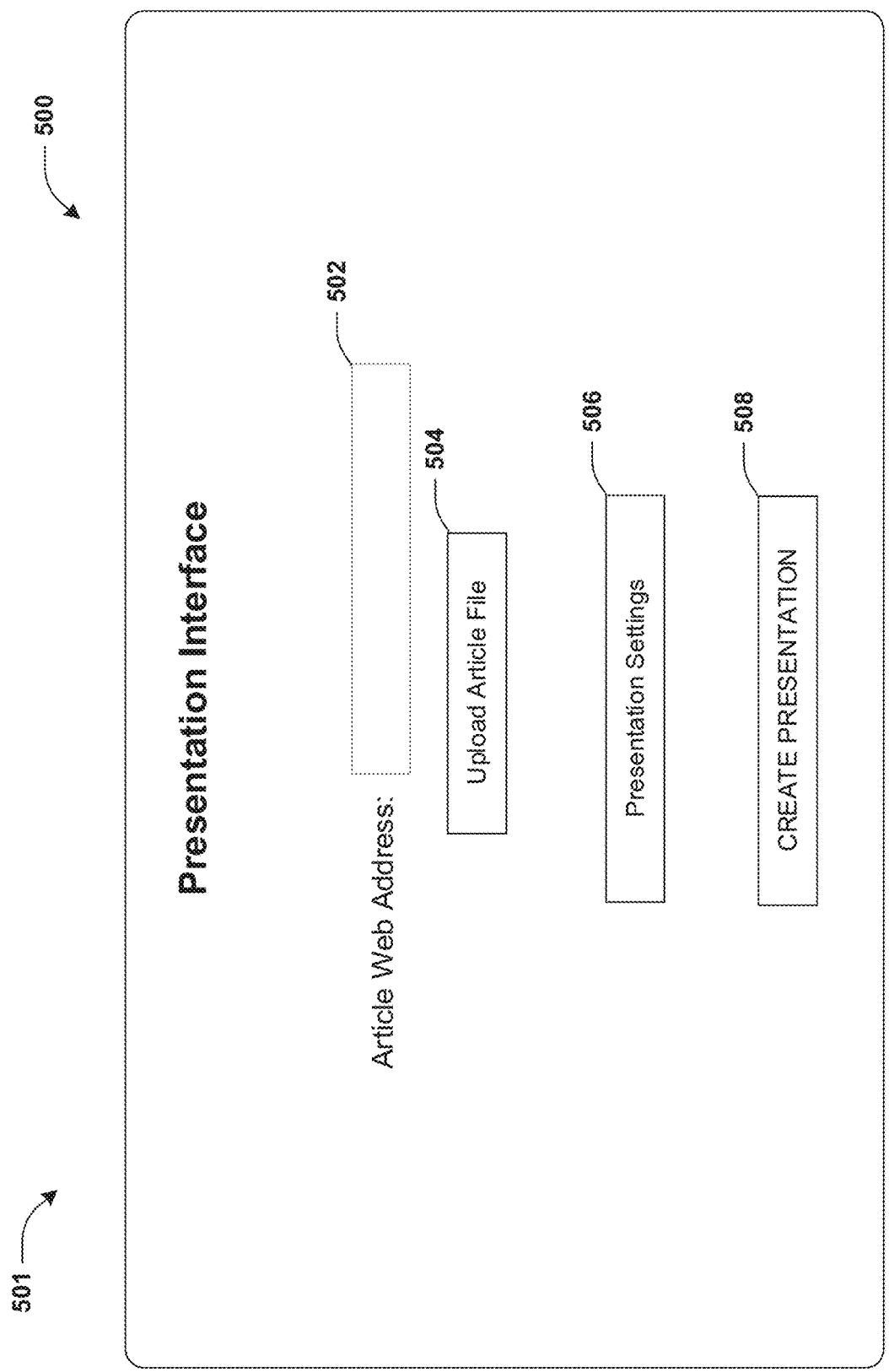
FIG. 5A is a component block diagram illustrating an example system for generating presentations based upon articles, where a first graphical user interface of a first device is controlled to display a presentation interface.

FIG. 5A illustrates the first graphical user interface of the first device 500 being controlled to display the presentation interface. For example, a request to generate a presentation may be received (from the first device 500) via the presentation interface. The request may comprise an indication of an article. In some examples, the presentation interface may comprise a first selectable input 502 corresponding to a web address (e.g., a URL) associated with the article and/or a second selectable input 504 corresponding to uploading a file associated with the article. For example, the web address associated with the article may be entered into the first selectable input 502 and/or the file associated with the article may be uploaded to one or more servers associated with the service using the second selectable input 504.

In some examples, the presentation interface may comprise a third selectable input 506 corresponding to one or more settings associated the presentation. For example, responsive to a selection of the third selectable input 506, a plurality of selectable inputs corresponding to the one or more settings associated with the presentation may be displayed. It may be appreciated that the plurality of selectable inputs corresponding to the one or more settings may be similar to at least some of selectable inputs illustrated in FIG. 5H. In some examples, the presentation interface may comprise a fourth selectable input 508 corresponding to generating the presentation. For example, responsive to a selection of the fourth selectable input 508, the request to generate the presentation may be received (from the first device 500).

Figure 5B:
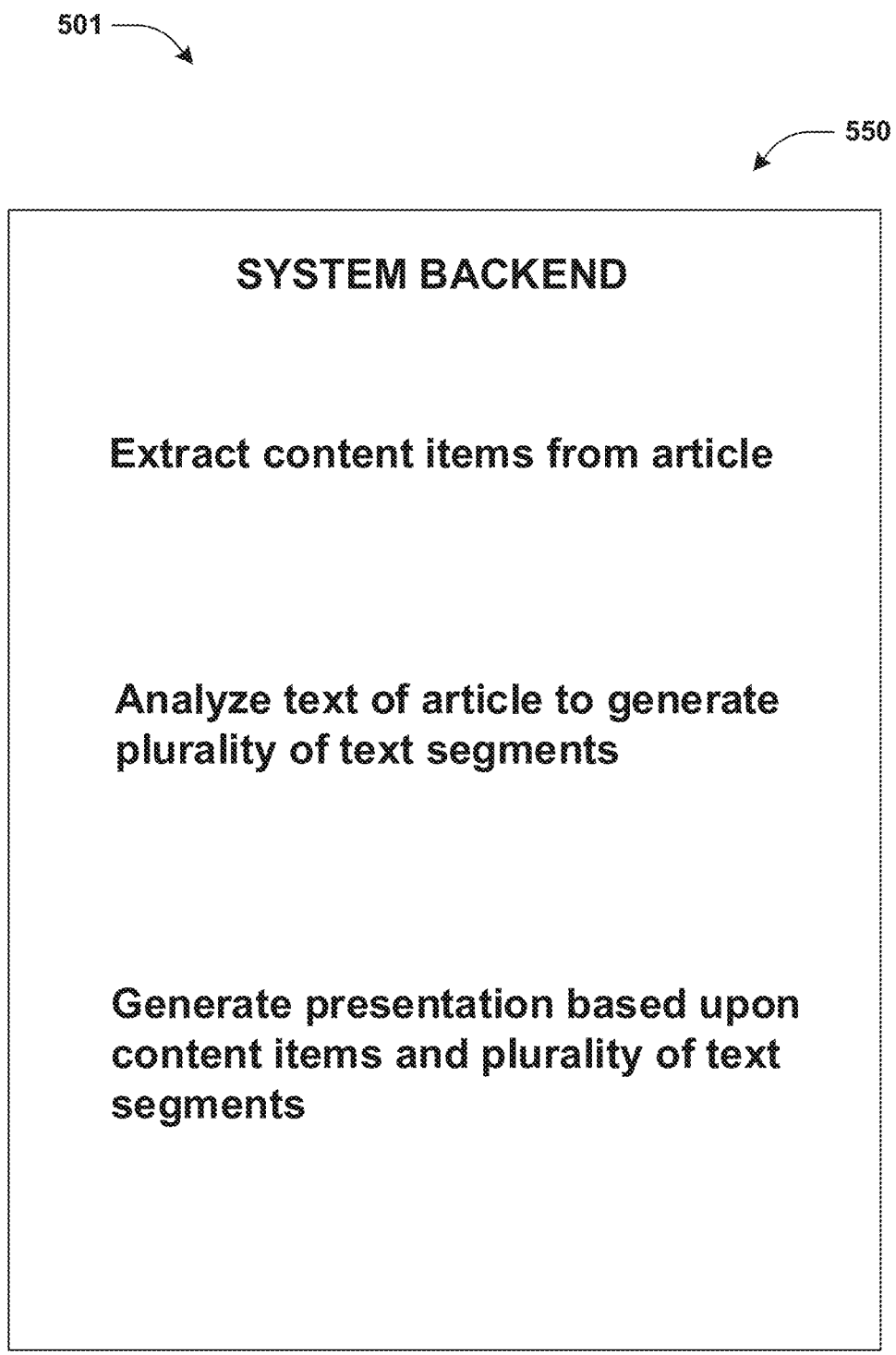
FIG. 5B is a component block diagram illustrating an example system for generating presentations based upon articles, where a backend system generates a presentation responsive to a selection of a fourth selectable input.

FIG. 5B illustrates a backend system 550 (e.g., on the one or more servers of the service and/or on the first device 500 of the first user) that may generate the presentation responsive to the selection of the fourth selectable input 508. In some examples, article content items may be extracted from the article. The article content items may comprise one or more videos of the article, one or more images of the article and/or one or more social media posts of the article. For example, source code (e.g., HTML source code) associated with the web address and/or the article may be accessed. The source code may be analyzed to identify the article content items. In some examples, the article content items may be downloaded and/or stored on the one or more servers.

Article text of the article may be analyzed to generate a plurality of text segments. For example, the article text may be analyzed to select a plurality of sets of text from the article text. For example, the article text may be divided into the plurality of sets of text based upon a plurality of sentence boundaries. A set of text of the plurality of sets of text may comprise one or more sentences of the article text. Alternatively and/or additionally, a set of text of the plurality of sets of text may comprise a portion of a sentence of the article text.

In some examples, the article text may be analyzed to determine a plurality of entities associated with the article. Alternatively and/or additionally, one or more natural language processing techniques may be performed to determine a set of entities associated with each set of text of the plurality of sets of text. In some examples, the plurality of sets of text may be analyzed generate a plurality of representations (e.g., vector representations). Each representation of the plurality of representations may correspond to a set of text of the plurality of sets of text.

In some examples, one or more optimization algorithms may be employed to select a second plurality of sets of text from the plurality of sets of text, for inclusion into a summary, based upon the plurality of representations. In some examples, the second plurality of sets of text may comprise a first set of text 503 (e.g., illustrated in FIG. 5I), comprising "Diggle has supporters throughout the country, including Alaska, Connecticut and other states. However, states that overwhelmingly support Diggle include Texas, Tennessee, Kentucky, Utah and Colorado.". Alternatively and/or additionally, the second plurality of sets of text may comprise a second set of text 505 (e.g., illustrated in FIG. 5I), comprising "Diggle and campaign members have worked on the election tirelessly for over a year. In a message to contributors to his campaign and to his supporters, he said 'We've lost the election, but we must remain proud for what we've done'."

In some examples, the summary and/or the second plurality of sets of text may be modified. For example, sets of text of the plurality of sets of text may be shortened by removing one or more portions of text from the sets of text and/or using one or more computing systems (e.g., a trained ANN, an autoencoder, etc.) to change orders of words, remove words, change sentence structure, etc. such that the sets of text of the second plurality of sets of text may be shorter and/or more understandable. For example, the first set of text 503 may be modified using the one or more computing systems to generate a modified version of the first set of text 503 comprising "His supporters are mainly from Texas, Tennessee, Kentucky, Utah and Colorado". In some examples, a first text segment of the plurality of text segments may comprise the modified version of the first set of text 503.

Alternatively and/or additionally, a quote comprising "We've lost the election, but we must remain proud for what we've done" may be determined based upon the second set of text 505. For example, a first set of entities (e.g., "John Diggle") may be determined based upon the second set of text 505 using one or more coreference resolution techniques. For example, a second text segment of the plurality of text segments may comprise the quote and/or an indication of the first set of entities (e.g., the second text segment may comprise "We've lost the election, but we must remain proud for what we've done—Diggle".

In some examples, the presentation may be generated based upon the article content items and/or the plurality of text segments. For example, the presentation may comprise a plurality of slides. In some examples, slides of the plurality of slides may comprise text segments of the plurality of text segments and/or content items of the article content items.

For example, a first slide 534 (illustrated in FIG. 5C) of the presentation may comprise a title of the presentation and/or a first content item. For example, a layout of the first slide 534 may be configured to be a title layout. In some examples, the title of the presentation may be generated based upon an article title of the article. In some examples, the first content item may be a first image. For example, information (e.g., captions associated with the article content items, the article text, descriptions of the article content items, etc.) associated with the article content items (e.g., captions associated with the article content items, descriptions of the article content items within the article text, etc.) may be analyzed to select the first content item from the article content items for inclusion into the first slide 534 based upon a determination that the first content item is associated with the plurality of entities associated with the article.

Alternatively and/or additionally, the first content item may not be identified from the article content items. For example, responsive to a determination that a content item associated with the plurality of entities is not available within the article content items (e.g., a determination that the article content items do not comprise a content item associated with the plurality of entities, a determination that the article content items comprise one or more content items associated with the plurality of entities that are used by one or more different slides of the presentation, etc.), a content items database may be analyzed to identify the first content item from the content items database.

Alternatively and/or additionally, a second slide 558 (e.g., illustrated in FIG. 5D) of the presentation may comprise the first text segment and/or a second content item. For example, a layout of the second slide 558 may be configured to be a text layout. In some examples, the second content item may be a second image. In some examples, a second set of entities associated with the first text segment may be determined. Information associated with the article content items may be analyzed to select the second content item from the article content items for inclusion into the second slide based upon a determination that the second content item is associated with the second set of entities.

In some examples, it may be determined that the second content item may have an image aspect ratio that is different than a device aspect ratio of one or more client devices. For example, the second content item may comprise a 16:9 image (e.g., a landscape image) and/or the one or more client devices may comprise 9:16 screens. In some examples, one or more motion settings of the second slide 558 may be configured such that while the second slide 558 is presented using the one or more client devices, the second slide 558 may comprise a representation of the second content item moving from a first part of the second content item (e.g., a right part of the second content item) to a second part of the second content item (e.g., a left part of the second content item).

Alternatively and/or additionally, a third slide 560 (e.g., illustrated in FIG. 5E) may comprise the second text segment and/or a third content item. For example, a layout of the third slide 560 may be configured to be a quotation layout. For example, the third slide 560 may comprise a quote symbol (e.g., ") indicative of the quote. In some examples, the third content item may be a third image. For example, information associated with the article content items may be analyzed to select the third content item from the article content items for inclusion into the third slide 560 based upon a determination that the third content item is associated with the first set of entities. In some examples, the third slide 560 may comprise a representation of the first set of entities (associated with the quote).

Figure 5C:
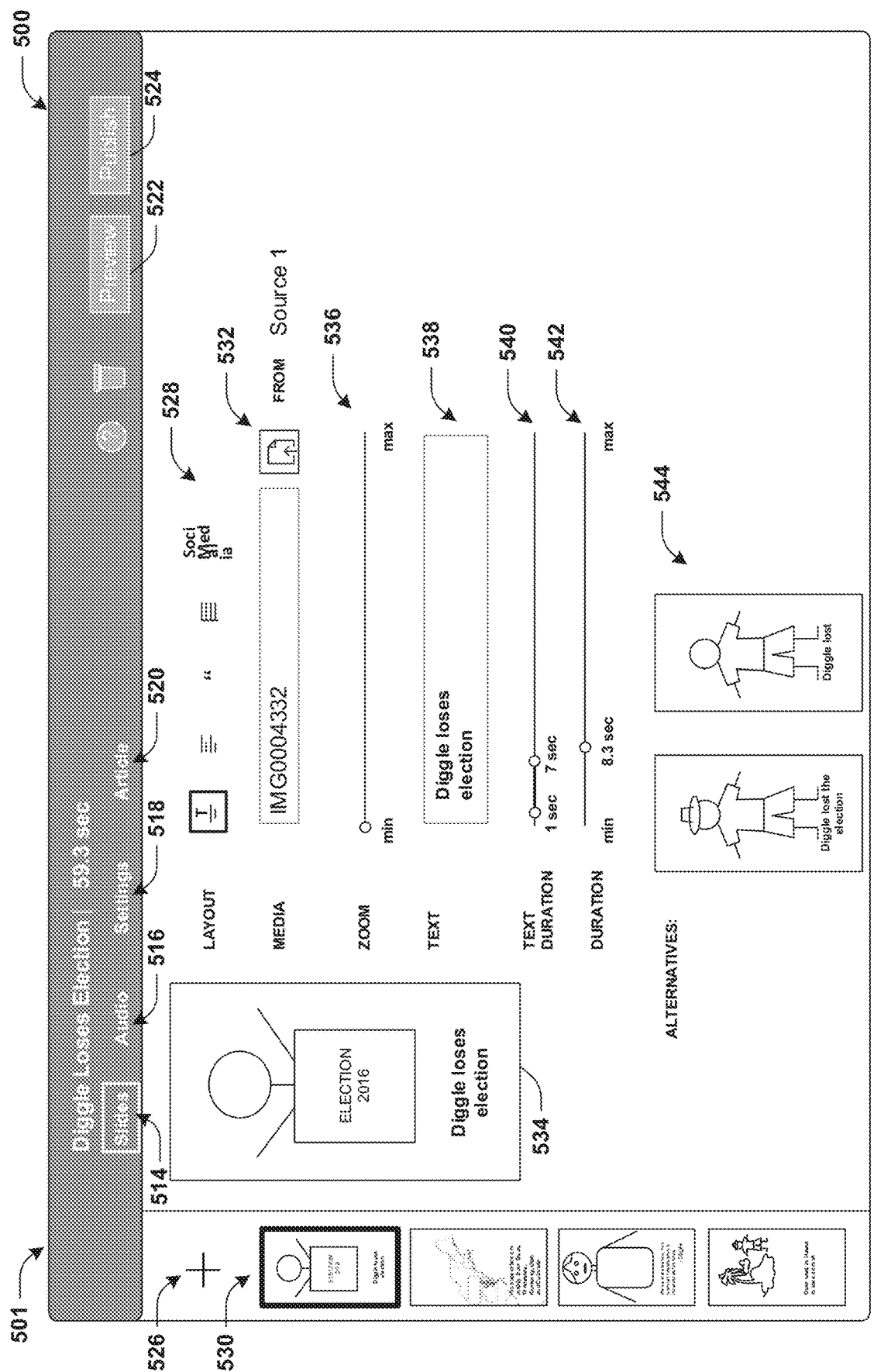
FIG. 5C is a component block diagram illustrating an example system for generating presentations based upon articles, where a first graphical user interface of a first device is controlled to display a presentation editing interface.
Figure 5D:
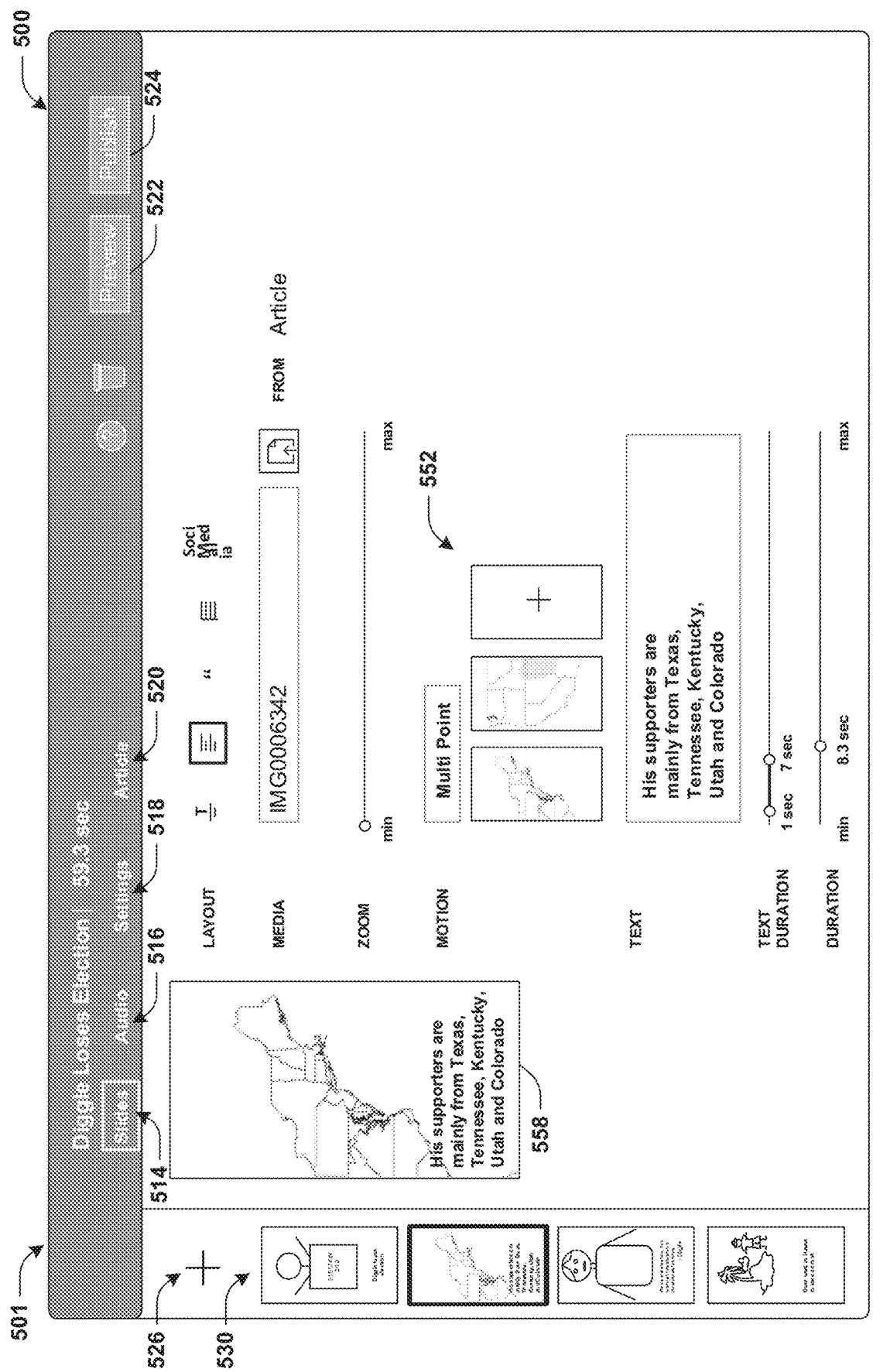
FIG. 5D is a component block diagram illustrating an example system for generating presentations based upon articles, where a first graphical user interface of a first device is controlled to display a presentation editing interface comprising a representation of a second slide and/or a third plurality of selectable inputs associated with the second slide.
Figure 5E:
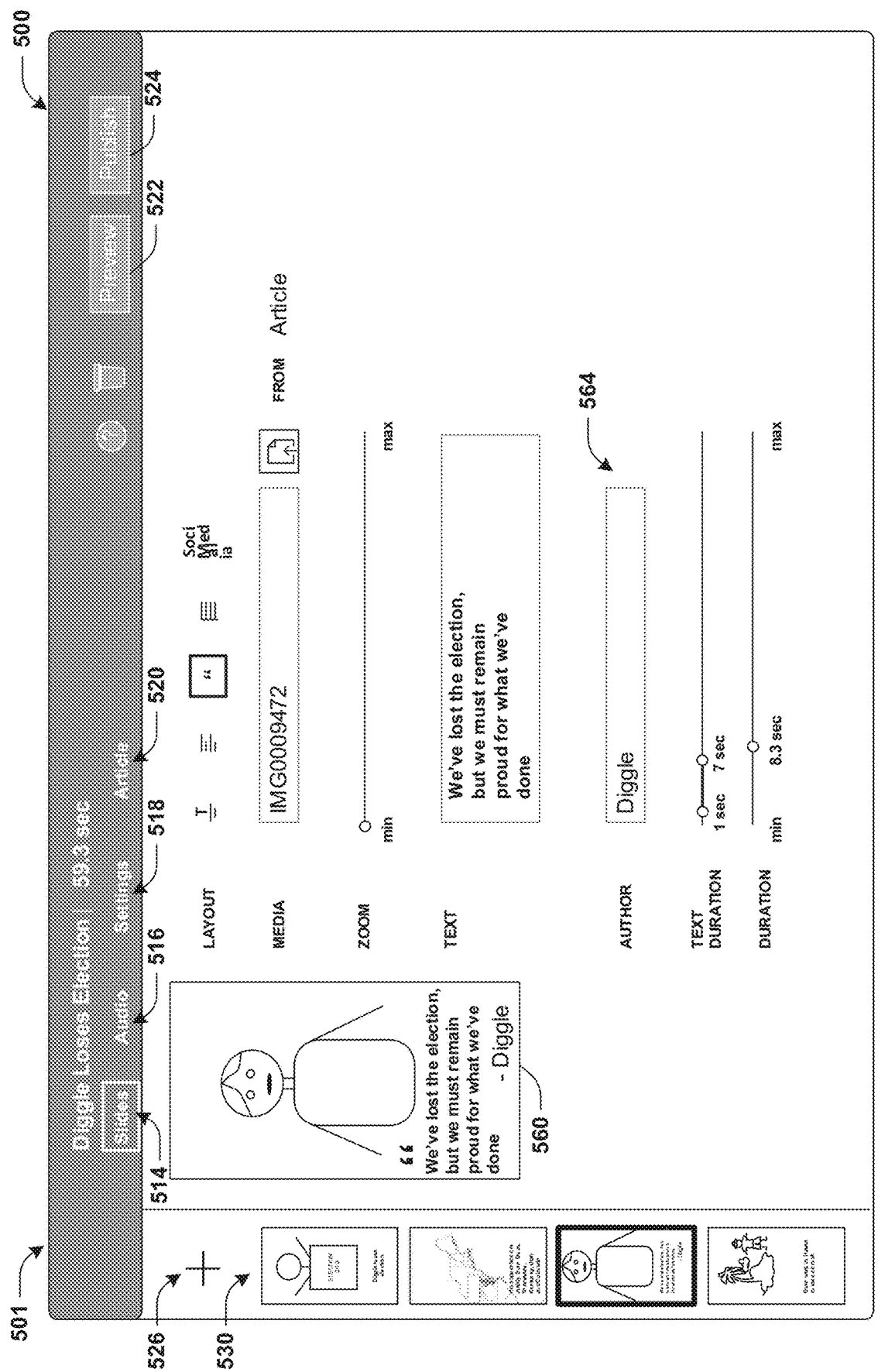
FIG. 5E is a component block diagram illustrating an example system for generating presentations based upon articles, where a first graphical user interface of a first device is controlled to display a presentation editing interface comprising a representation of a third slide and/or a fourth plurality of selectable inputs associated with the third slide.
Figure 5F:
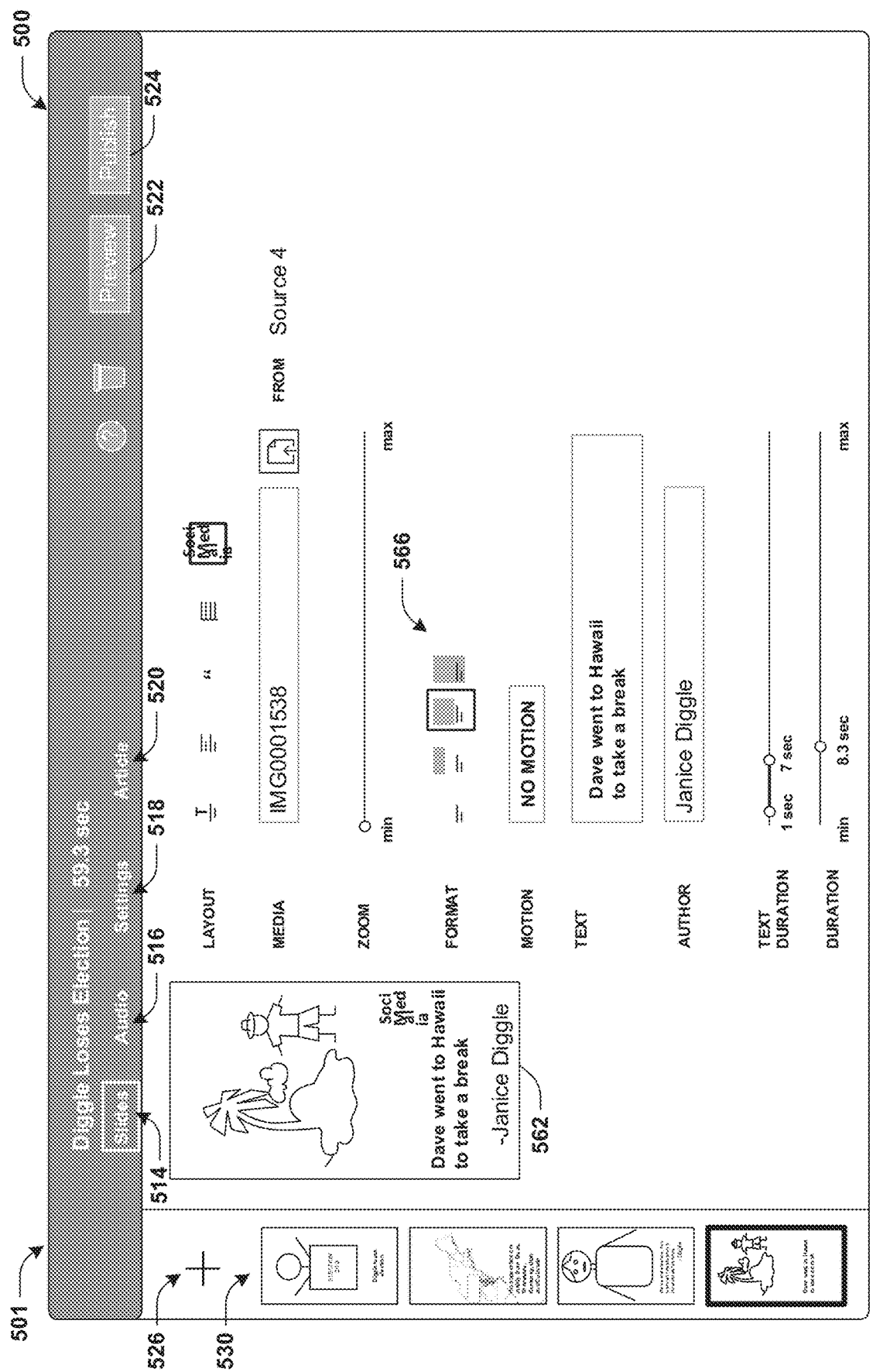
FIG. 5F is a component block diagram illustrating an example system for generating presentations based upon articles, where a first graphical user interface of a first device is controlled to display a presentation editing interface comprising a representation of a fourth slide and/or a fifth plurality of selectable inputs associated with the fourth slide.
Figure 5G:
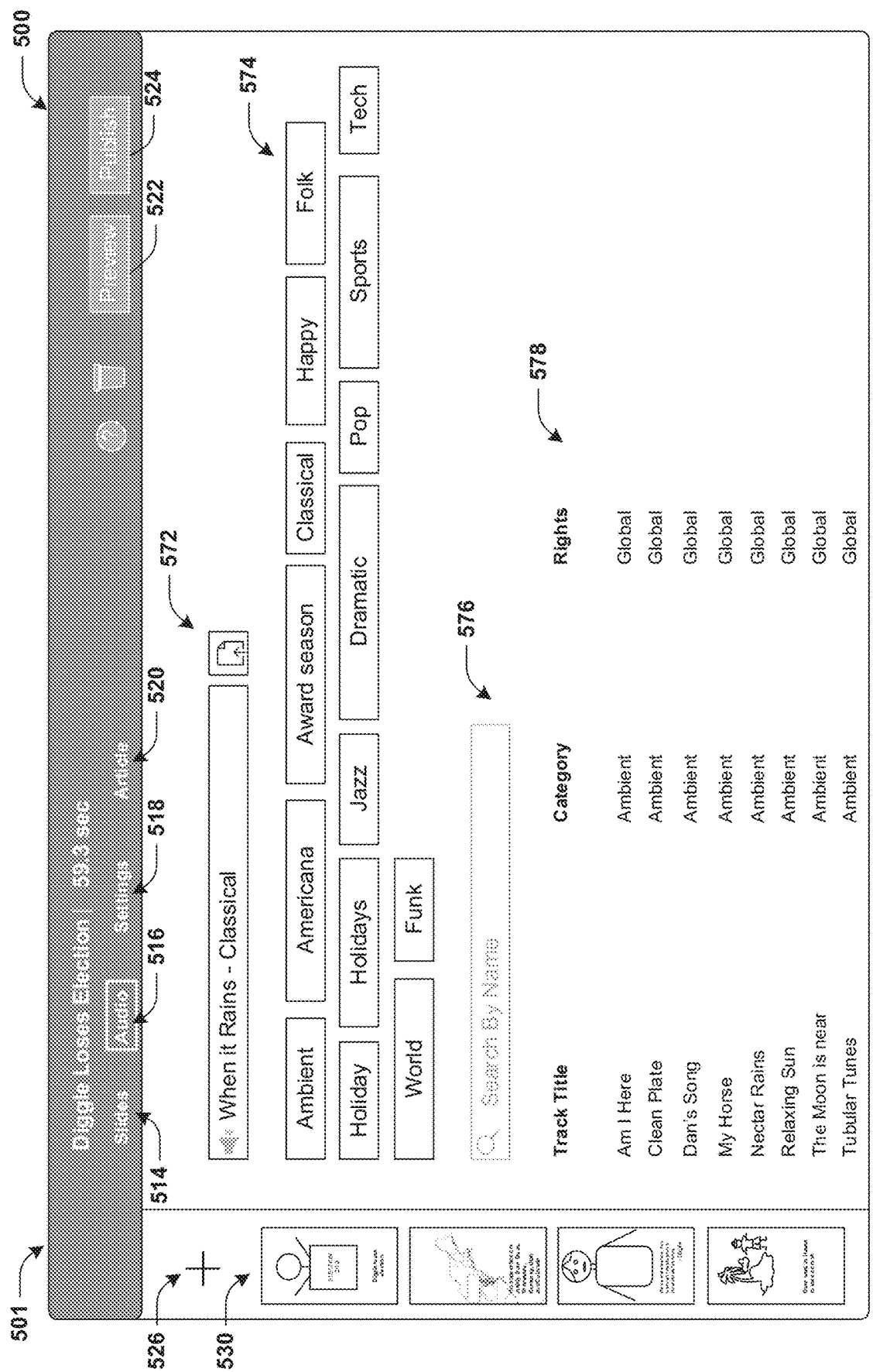
FIG. 5G is a component block diagram illustrating an example system for generating presentations based upon articles, where a first graphical user interface of a first device is controlled to display an audio settings interface of a presentation editing interface.
Figure 5H:
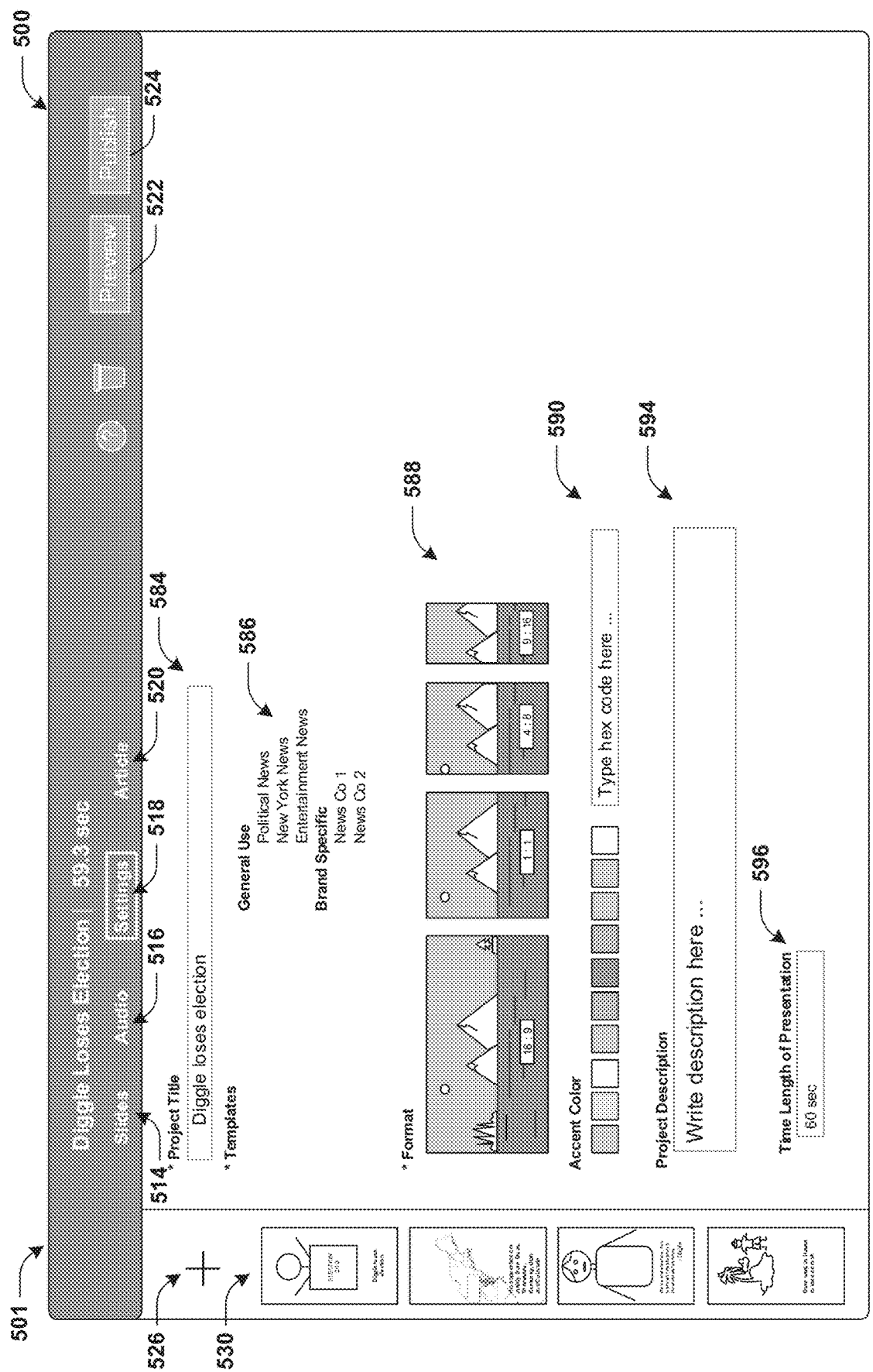
FIG. 5H is a component block diagram illustrating an example system for generating presentations based upon articles, where a first graphical user interface of a first device is controlled to display a settings interface of a presentation editing interface.
Figure 5I:
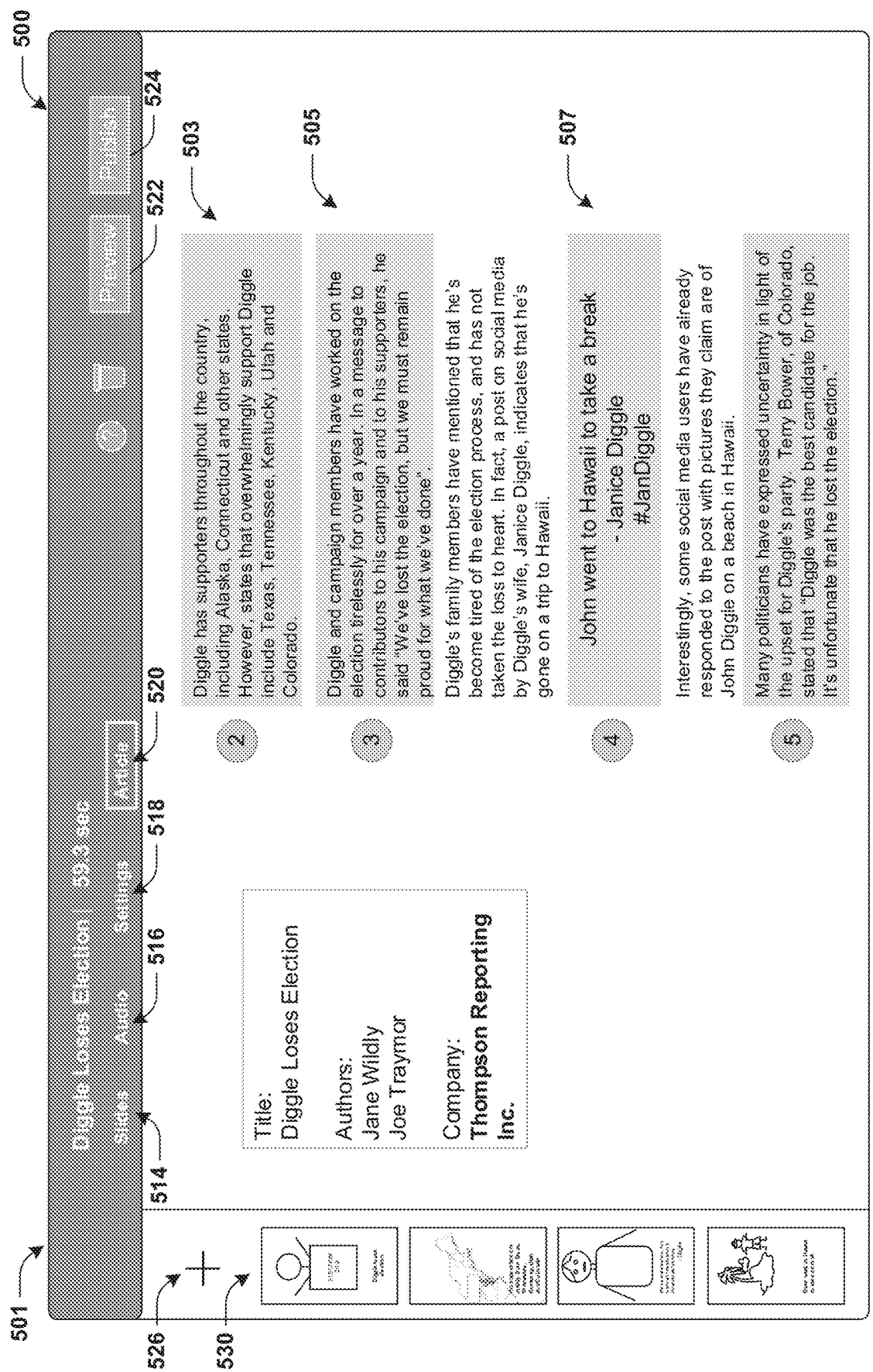
FIG. 5I is a component block diagram illustrating an example system for generating presentations based upon articles, where a first graphical user interface of a first device is controlled to display an article interface of a presentation editing interface.

Alternatively and/or additionally, a fourth slide 562 (e.g., illustrated in FIG. 5F) may comprise a formatted version of a social media post 507 (e.g., illustrated in FIG. 5I). For example, the article content items may comprise the social media post 507. A type of the social media post 507 may be determined. In some examples, the type of the social media post 507 may be associated with a social media platform "Social Media" of the social media post 507. In some examples, the social media post 507 may be formatted based upon the type of the social media post 507 to generate the formatted version of the social media post 507. For example, the formatted version of the social media post 507 may comprise a symbol (e.g., "Social Media") associated with the social media platform. A layout of the fourth slide 562 may be configured to be a social media layout associated with the type of the social media post 507. Alternatively and/or additionally, the fourth slide 562 may comprise a fourth content item. For example, responsive to a determination that the social media post 507 does not comprise an image and/or a video, the fourth slide 562 may be generated comprising the fourth content item. The fourth content item may comprise a fourth image.

FIG. 5C illustrates the first graphical user interface of the first device 500 being controlled to display a presentation editing interface. For example, the presentation editing interface may comprise a fifth selectable input 514 "Slides" corresponding to a slide editing interface of the presentation editing interface. Alternatively and/or additionally, the presentation editing interface may comprise a sixth selectable input 516 "Audio" corresponding to an audio settings interface of the presentation editing interface. Alternatively and/or additionally, the presentation editing interface may comprise a seventh selectable input 518 "Settings" corresponding to a settings interface of the presentation editing interface. Alternatively and/or additionally, the presentation editing interface may comprise an eighth selectable input 520 "Article" corresponding to an article interface of the presentation editing interface.

Alternatively and/or additionally, the presentation editing interface may comprise a ninth selectable input 522 "Preview" corresponding to viewing the presentation (e.g., responsive to a selection of the ninth selectable input 522, a representation of the presentation may be displayed). Alternatively and/or additionally, the presentation editing interface may comprise a tenth selectable input 526 corresponding to adding a slide to the plurality of slides of the presentation. Alternatively and/or additionally, the presentation editing interface may comprise an eleventh set of selectable inputs 530 corresponding to the plurality of slides. For example, responsive to a selection of a selectable input of the eleventh set of selectable inputs 530, a representation of a slide corresponding to the selectable input, selectable inputs associated with the slide and/or settings associated with the slide may be displayed.

For example, a representation of the first slide 534 and/or a second plurality of selectable inputs associated with the first slide 534 may be displayed. For example, the second plurality of selectable inputs may comprise a twelfth set of selectable inputs 528 corresponding to the layout of the first slide 534. Alternatively and/or additionally, the second plurality of selectable inputs may comprise a thirteenth selectable input 532 corresponding to the first content item associated with the first slide 534. For example, the thirteenth selectable input 532 may comprise an indication of the first content item. The first content item may be removed from the first slide 534 using the thirteenth selectable input 532 and/or a fifth content item may be added to the first slide 534 using the thirteenth selectable input 532. In some examples, the presentation editing interface may comprise an indication of a source associated with the first content item.

The second plurality of selectable inputs may comprise a fourteenth selectable input 536 corresponding to one or more zooming characteristics associated with the first slide 534. For example, the one or more zooming characteristics may be associated with a defined level of magnification of the first content item of the first slide 534. In some examples, the one or more zooming characteristics may be modified using the fourteenth selectable input 536. Alternatively and/or additionally, the second plurality of selectable inputs may comprise a text area 538 corresponding to the title of the presentation associated with the first slide 534. For example, the title of the presentation may be modified using the text area 538.

Alternatively and/or additionally, the second plurality of selectable inputs may comprise a fifteenth selectable input 542 corresponding to a duration of the first slide 534 (e.g., 8.3 seconds). For example, the duration of the first slide 534 may be associated with a length of time that the first slide 534 may be displayed on a client device. In some examples, the duration of the first slide 534 may be modified using the fifteenth selectable input 542. Alternatively and/or additionally, the second plurality of selectable inputs may comprise a sixteenth selectable input 540 corresponding to a text duration associated with the first slide 534. For example, the text duration of the first slide 534 may be associated with a timespan of the duration of the first slide 534 that the title of the presentation is displayed. For example, the timespan may be 1 second after the first slide 534 is displayed until 7 seconds after the first slide 534 is displayed. Accordingly, the title of the presentation may be displayed 1 second after the first slide 534 is displayed until 1.3 seconds before the first slide 534 is stopped being displayed. In some examples, the text duration of the first slide 534 may be modified using the sixteenth selectable input 540.

In some examples, the second plurality of selectable inputs may comprise a seventeenth set of selectable inputs 544 corresponding to a set of alternative versions of the first slide 534. For example, the set of alternative versions may comprise different content items than the first content item and/or different titles than the title of the presentation. For example, an alternative version of the first slide 534 may be selected from the set of alternative versions of the first slide 534 using the seventeenth set of selectable inputs 544.

FIG. 5D illustrates the first graphical user interface of the first device 500 being controlled to display the presentation editing interface comprising a representation of the second slide 558 and/or a third plurality of selectable inputs associated with the second slide 558. For example, the third plurality of selectable inputs may comprise an eighteenth set of selectable inputs 552 corresponding to the one or more motion settings of the second slide 558. For example, the one or more motion settings are configured such that the second slide 558 comprises a representation of the second content item moving from the first part of the second content item (e.g., the right part of the second content item) to the second part of the second content item (e.g., the left part of the second content item). In some examples, the one or more motion settings may be modified using the eighteenth set of selectable inputs 552. For example, the first part of the second content item may be changed, the second part of the second content item may be changed, a third part of the second content item may be added, etc. Alternatively and/or additionally, the one or more motion settings may be modified such that the second slide 558 does not comprise a representation of motion of the second content item.

FIG. 5E illustrates the first graphical user interface of the first device 500 being controlled to display the presentation editing interface comprising a representation of the third slide 560 and/or a fourth plurality of selectable inputs associated with the third slide 560. For example, the fourth plurality of selectable inputs may comprise a nineteenth selectable input 564 corresponding to the first set of entities associated with the quote. For example, the first set of entities may be modified using the nineteenth selectable input 564. For example, "John Diggle" may be changed to "Diggle". Accordingly, the representation of the first set of entities within the third slide 560 may be changed from "John Diggle" to "Diggle".

FIG. 5F illustrates the first graphical user interface of the first device 500 being controlled to display the presentation editing interface comprising a representation of the fourth slide 562 and/or a fifth plurality of selectable inputs associated with the fourth slide 562. For example, the fifth plurality of selectable inputs may comprise a twentieth set of selectable inputs 566 corresponding to one or more format settings associated with the fourth slide 562. For example, the one or more format settings may correspond to a position of the formatted version of the social media post 507 associated with the fourth slide 562 and/or a position of the fourth content item of the fourth slide 562. For example, the social media post 507 may be positioned below the fourth content item. In some examples, the one or more format settings may be modified using the twentieth set of selectable inputs 507.

FIG. 5G illustrates the first graphical user interface of the first device 500 being controlled to display the audio settings interface of the presentation editing interface. The audio settings interface may comprise a sixth plurality of selectable inputs associated with one or more audio settings of the presentation. For example, the sixth plurality of selectable inputs may comprise a twenty-first set of selectable inputs 572 corresponding to a first audio file associated with the presentation (e.g., the first audio file may be outputted using a speaker of a client device while the presentation is presented). Alternatively and/or additionally, the first audio file may be removed and/or a second audio file may be uploaded and/or added to the presentation using the twenty-first set of selectable inputs 572.

In some examples, the sixth plurality of selectable inputs may comprise a twenty-second set of selectable inputs 574 corresponding to a plurality of music genres. Alternatively and/or additionally, the sixth plurality of selectable inputs may comprise a twenty-third selectable input 576 corresponding to searching for audio files. Alternatively and/or additionally, the sixth plurality of selectable inputs may comprise a twenty-fourth set of selectable inputs 578 corresponding to a list of audio files. For example, the twenty-second set of selectable inputs 574, the twenty-third selectable input 576 and/or the twenty-fourth set of selectable inputs 578 may be used to browse through audio files, identify audio files and/or select audio files for the presentation.

FIG. 5H illustrates the first graphical user interface of the first device 500 being controlled to display the settings interface of the presentation editing interface. For example, the settings interface may comprise a seventh plurality of selectable inputs associated with presentation settings of the presentation. For example, the seventh plurality of selectable inputs may comprise a twenty-fifth selectable input 584 corresponding to a project title associated with the presentation. In some examples, the project title may be modified using the twenty-fifth selectable input 584.

Alternatively and/or additionally, the seventh plurality of selectable inputs may comprise a twenty-sixth set of selectable inputs 586 corresponding to one or more template settings associated with the presentation. For example, the twenty-sixth set of selectable inputs 586 may be associated with a plurality of templates. In some examples, the one or more template settings may be modified and/or a presentation template of the presentation may be selected from the plurality of templates using the twenty-sixth set of selectable inputs 586.

In some examples, the seventh plurality of selectable inputs may comprise a twenty-seventh set of selectable inputs 588 corresponding to one or more aspect ratio settings associated with the presentation. For example, the one or more aspect ratio settings may be associated with one or more aspect ratios supported by the presentation. In some examples, the one or more aspect ratios may be selected using the twenty-seventh set of selectable inputs 588. For example, one or more versions of the presentation may be generated based upon the one or more aspect ratios. For example, each version of the one or more versions of the presentation may correspond to an aspect ratio of the one or more aspect ratios. In some examples, the one or more aspect ratio settings may be modified using the twenty-seventh set of selectable inputs 588.

Alternatively and/or additionally, the seventh plurality of selectable inputs may comprise a twenty-eighth set of selectable inputs 590 corresponding to one or more color settings associated with the presentation. For example, the one or more color settings may be associated with one or more colors, one or more color schemes and/or one or more accent colors associated with the one or more content items of the presentation, one or more slides of the presentation, one or more slide backgrounds of the presentation, etc. In some examples, the one or more color settings may be modified using the twenty-eighth set of selectable inputs 590 (e.g., and/or a hex code associated with a color, a color scheme and/or an accent color may be inputted using the twenty-eighth set of selectable inputs 590.

In some examples, the seventh plurality of selectable inputs may comprise a twenty-ninth selectable input 594 corresponding to a project description associated with the presentation. In some examples, the project description may be entered and/or modified using the twenty-ninth selectable input 594. Alternatively and/or additionally, the seventh plurality of selectable inputs may comprise a thirtieth selectable input 596 corresponding to a maximum time-length of the presentation. For example, the maximum time-length may be modified using the thirtieth selectable input 596.

FIG. 5I illustrates the first graphical user interface of the first device 500 being controlled to display the article interface of the presentation editing interface. For example, the article interface may comprise a representation of the article and/or one or more representations of sections of the article text incorporated in the presentation. Alternatively and/or additionally, the representation of the article may comprise a plurality of indications of a plurality of sections of the article text associated with the plurality of slides.

For example, the representation of the article may comprise an indication of a first section of the article text (corresponding to the first set of text 503) being incorporated into the second slide 558. Alternatively and/or additionally, the representation of the article may comprise an indication of a second section of the article text (corresponding to the second set of text 505) being incorporated into the third slide 560. Alternatively and/or additionally, the representation of the article may comprise an indication of the social media post 507 being incorporated into the fourth slide 562. Alternatively and/or additionally, the representation of the article may comprise an indication of a third section of the article text being incorporated into a fifth slide of the plurality of slides.

In some examples, the presentation editing interface may comprise a thirty-first selectable input 524 "Publish" corresponding to publishing the presentation. For example, responsive to receiving a selection of the thirty-first selectable input 524, an edited presentation may be generated based upon one or more inputs received via the presentation editing interface (e.g., corresponding to one or more edits to the presentation). In some examples, an edited presentation file associated with the edited presentation may be uploaded to one or more second servers associated with a second service that provides a news interface for accessing and/or interacting with articles (e.g., news articles) and/or presentations (e.g., presentations associated with the news articles).

Figure 5J:
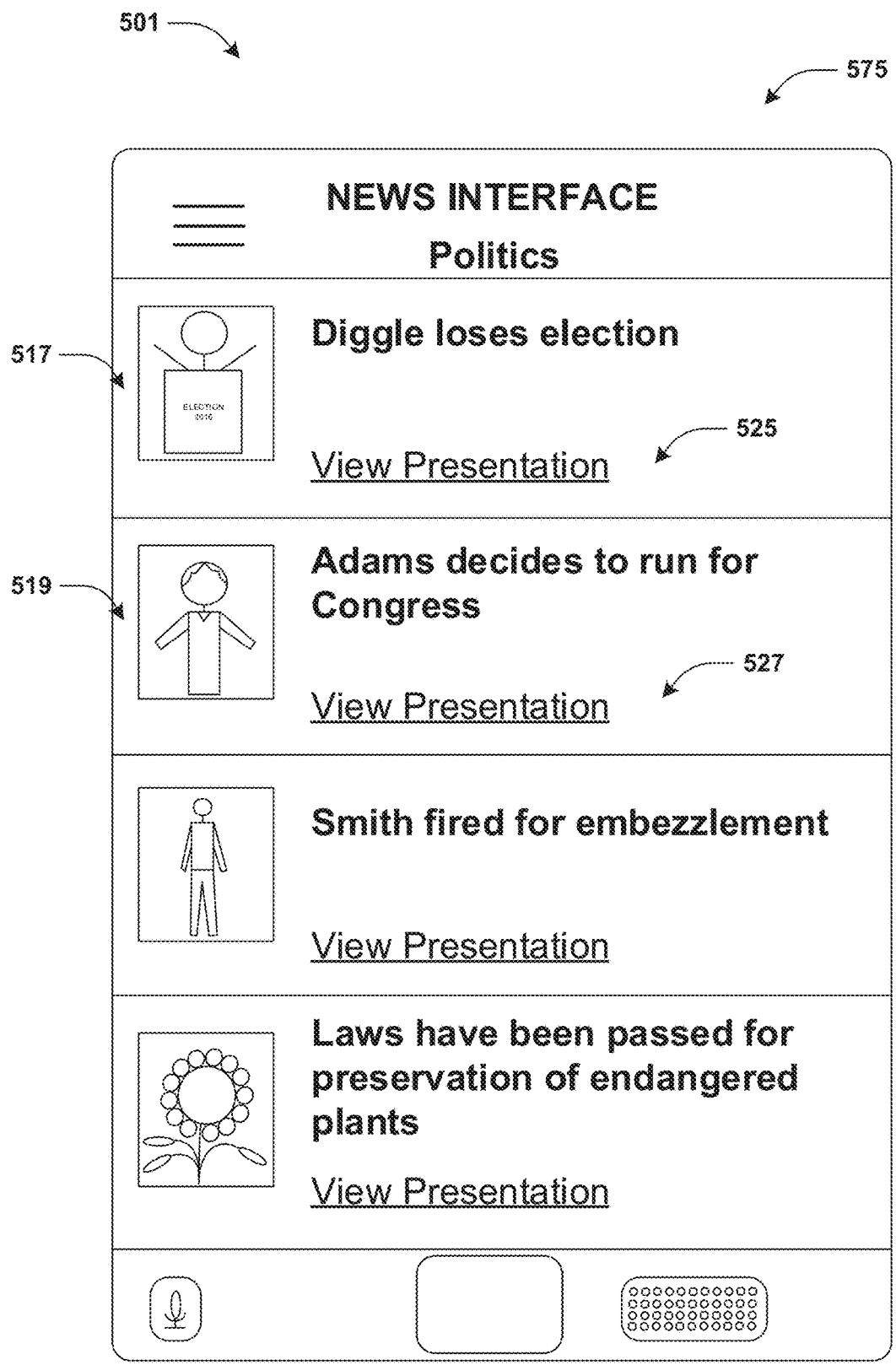
FIG. 5J is a component block diagram illustrating an example system for generating presentations based upon articles, where a second graphical user interface of a second device is controlled to display a news interface.

FIG. 5J illustrates a second graphical user interface of a second client device 575 being controlled to display the news interface. For example, the news interface may display a list of articles. For example, the list of articles may comprise a thirty-second selectable input 517 corresponding to the article, a thirty-third selectable input 525 corresponding to the edited presentation, a thirty-fourth selectable input 519 corresponding to a second article and/or a thirty-fifth selectable input 527 corresponding to a second presentation associated with the second article. For example, the thirty-third selectable input 525 may be selected. Responsive to the selection of the thirty-third selectable input 525, the second graphical user interface of the second client device 575 may be controlled to display the edited presentation.

Figure 5K:
FIG. 5K is a component block diagram illustrating an example system for generating presentations based upon articles, where a second graphical user interface of a second device is controlled to display an edited presentation.

FIG. 5K illustrates the second graphical user interface of the second client device 575 being controlled to display the edited presentation. For example, the first slide 534 of the edited presentation may be displayed. In some examples, the edited presentation may be interactive (e.g., actions associated with the edited presentation may be performed responsive to inputs received via the second client device 575). For example, responsive to receiving a first input via the edited presentation (e.g., sliding a touchscreen of the second client device 575 in a first direction), the second slide 558 may be displayed.

Figure 5L:
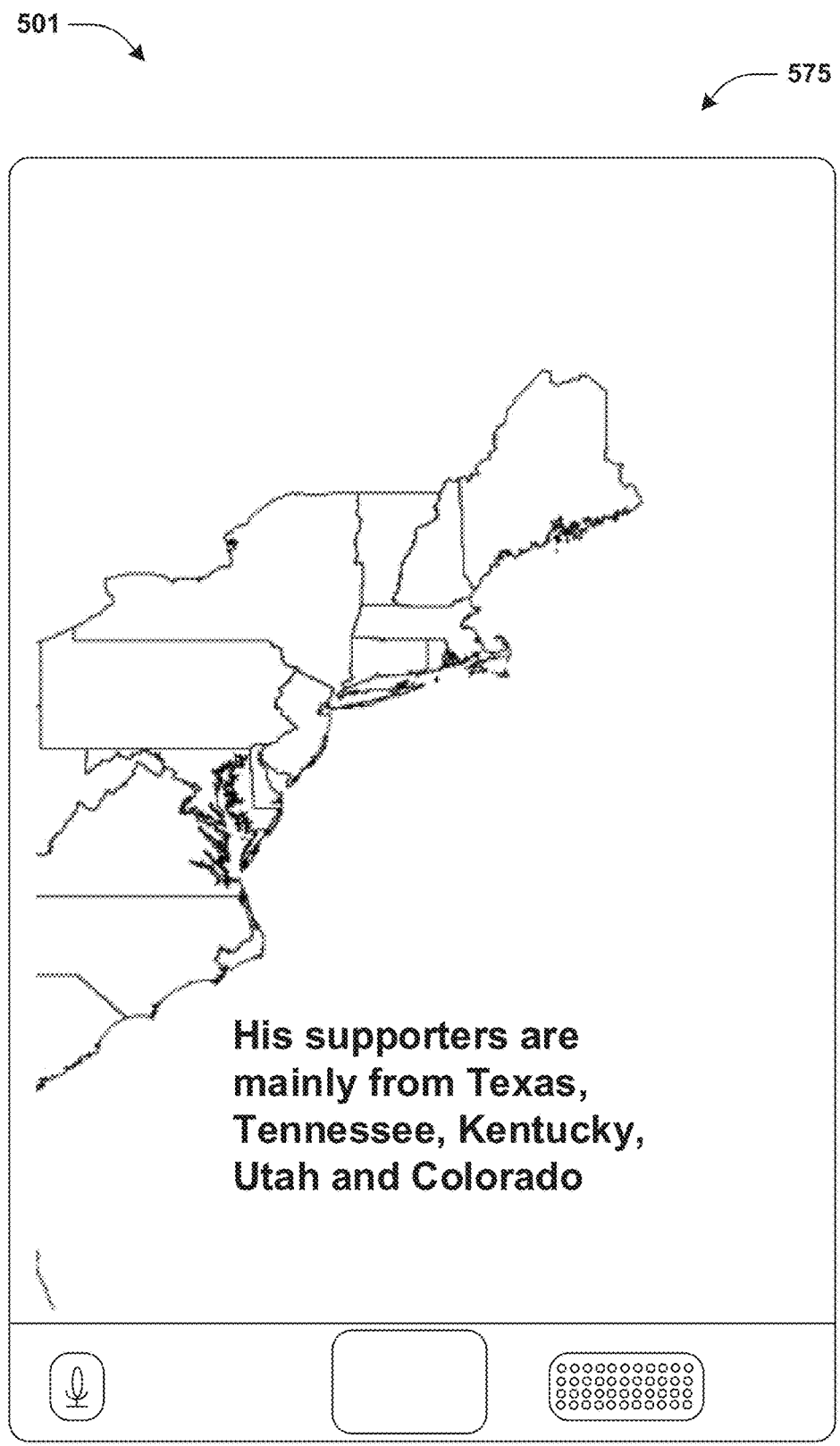
FIG. 5L is a component block diagram illustrating an example system for generating presentations based upon articles, where a second graphical user interface of a second device is controlled to display a second slide of an edited presentation.
Figure 5M:
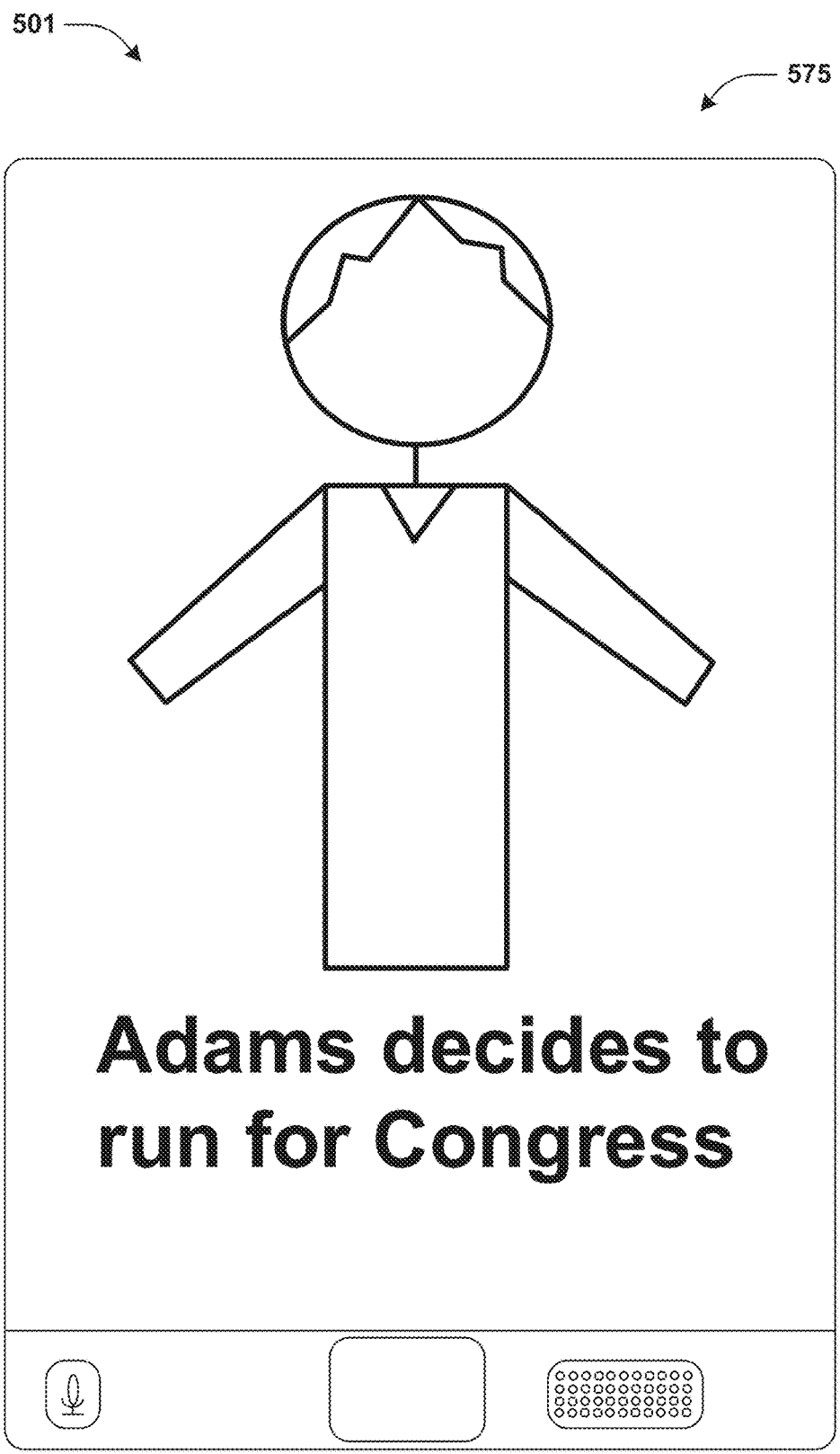
FIG. 5M is a component block diagram illustrating an example system for generating presentations based upon articles, where a second graphical user interface of a second device is controlled to display a second presentation.

FIG. 5L illustrates the second graphical user interface of the second client device 575 being controlled to display the second slide 558 of the edited presentation. For example, responsive to receiving a second input via the edited presentation (e.g., sliding the touchscreen in the first direction with greater speed than a speed associated with the first input), the second graphical user interface may be controlled to display the second presentation associated with the second article. FIG. 5M illustrates the second graphical user interface of the second client device 575 being controlled to display the second presentation.

It may be appreciated that the disclosed subject matter may assist a first user (and/or a first device associated with the first user) in generating a plurality of text segments associated with an article, extracting content items from the article and/or automatically creating a presentation based upon the plurality of text segments, the content items and/or a content items database. Alternatively and/or additionally, the disclosed subject matter may assist the first user and/or the first device in identifying the plurality of text segments, the content items and/or one or more content items associated with the article from the content items database without having to spend time consuming the article and/or searching through the content items database. Alternatively and/or additionally, the disclosed subject matter may assist the first user and/or the first device in editing the presentation to create an edited presentation without having to spend time consuming the article. Alternatively and/or additionally, the disclosed subject matter may assist a second user and/or a second device in understanding main points of the article by displaying the presentation and/or the edited presentation.

Implementation of at least some of the disclosed subject matter may lead to benefits including, but not limited to, a reduction in screen space and/or an improved usability of a first display (e.g., of the first device) (e.g., as a result of displaying the plurality of text segments and/or sections of the article associated with the plurality of text segments such that a new window does not need to be opened to display the article and/or the article does not need to be consumed to identify the plurality of text segments and/or the sections of the article, as a result of automatically generating the presentation such that a new window does not need to be opened to manually create the presentation, as a result of enabling the first device to display a presentation editing interface comprising automatically selected settings associated with the presentation and/or selectable inputs for modifying the automatically selected settings such that presentation may be displayed and the automatically selected settings may be modified within a single interface, as a result of automatically selecting a plurality of content items associated with the presentation based upon entities associated with the article such that a separate window does not need to be opened to search for the plurality of content items, etc.).

Alternatively and/or additionally, implementation of at least some of the disclosed subject matter may lead to benefits including a reduction in screen space and/or an improved usability of a second display (e.g., of the second device) (e.g., as a result of determining an aspect ratio associated with the second device, as a result of controlling a graphical user interface of the second device to display the presentation and/or the edited presentation based upon the aspect ratio, etc.).

Alternatively and/or additionally, implementation of at least some of the disclosed subject matter may lead to benefits including increasing accuracy and/or precision in transmitting requested and/or desired content to the first device and/or presenting the requested and/or desired content to the first user (e.g., as a result of enabling the first device to display the automatically selected settings, the plurality of text segments and/or the plurality of content items without the first user having to consume the first article and/or create the plurality of text segments and/or identify the plurality of content items manually, etc.).

Alternatively and/or additionally, implementation of at least some of the disclosed subject matter may lead to benefits including increasing accuracy and/or precision in transmitting requested and/or desired content to the second device and/or presenting the requested and/or desired content to the second user (e.g., as a result of enabling the second device to display the presentation and/or the second presentation such that the second user may understand and/or determine a significance of main points of the article without having to consume the article).

Alternatively and/or additionally, implementation of at least some of the disclosed subject matter may lead to benefits including a reduction in bandwidth (e.g., as a result of reducing a need for downloading content items in order to identify the plurality of content items, etc.).

In some examples, at least some of the disclosed subject matter may be implemented on a device (e.g., a client device), and in some examples, at least some of the disclosed subject matter may be implemented on a server (e.g., hosting a service accessible via a network, such as the Internet).

Figure 6:
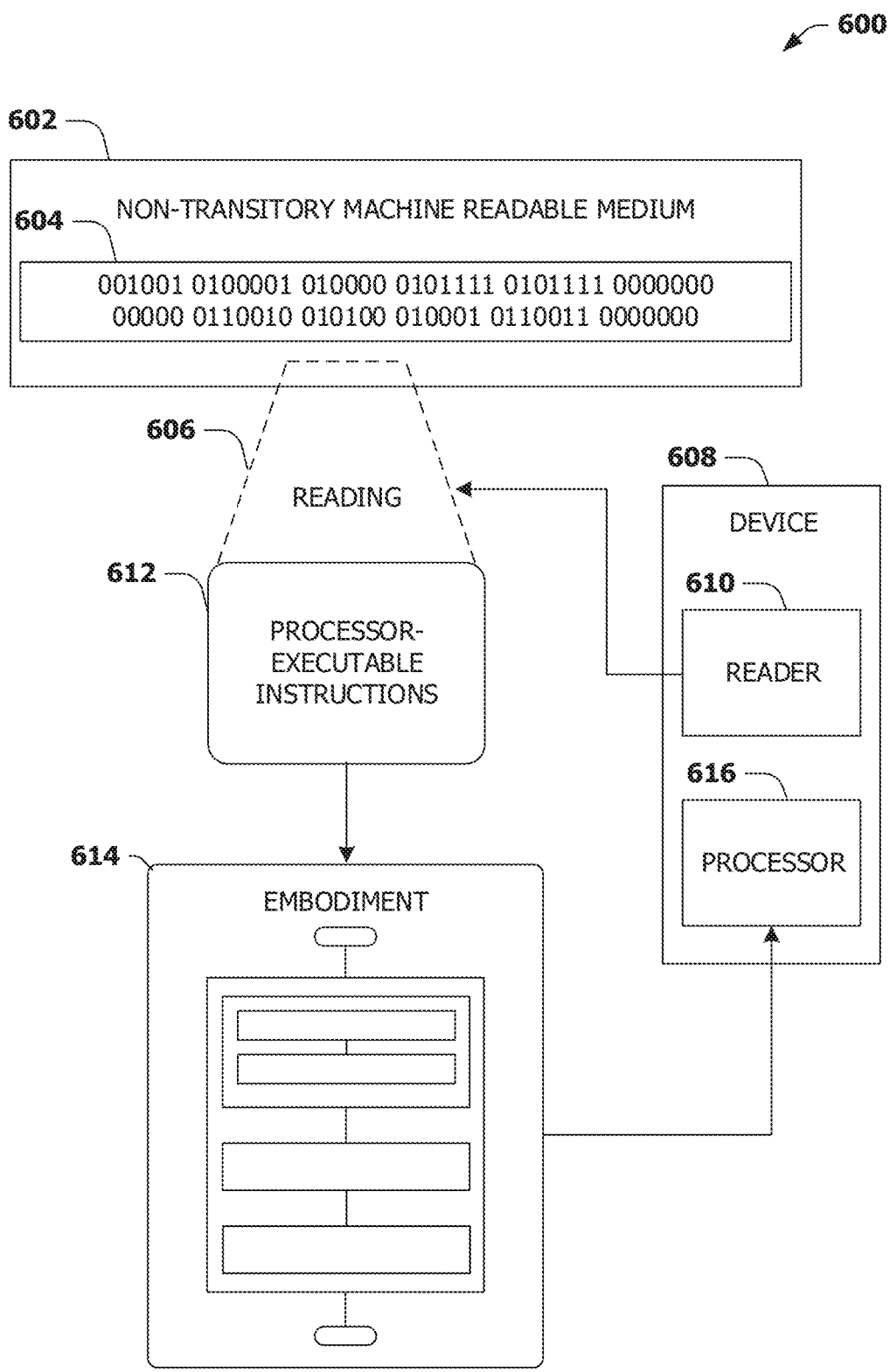
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the example system 501 of FIGS. 5A-5M, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   receiving a request to generate a presentation, wherein the request comprises an indication of an article;
   extracting content items from the article, wherein the content items comprise at least one of one or more videos, one or more images or one or more social media posts;
   analyzing text of the article to generate a plurality of text segments;
   generating one or more settings for the presentation based upon an analysis of the article, wherein the one or more settings comprise at least one of a maximum time-length of the presentation, a maximum amount of text associated with the presentation, motion settings associated with the presentation or zooming characteristics associated with the presentation;
   generating the presentation, comprising a plurality of slides, based upon the one or more settings, the content items and the plurality of text segments;
   controlling a first graphical user interface of a first client device to display a presentation editing interface comprising a representation of the presentation;
   receiving one or more inputs via the presentation editing interface corresponding to one or more edits to the presentation;
   generating an edited presentation based upon the one or more inputs;
   receiving a second request from a second client device to present the edited presentation; and
   controlling a second graphical user interface of the second client device to display the edited presentation.

2. The method of claim 1, wherein the generating the one or more settings comprises generating the maximum amount of text associated with the presentation based upon the analysis of the article.

3. The method of claim 1, wherein the content items comprise a social media post, wherein the generating the presentation comprises:
   determining a type of the social media post;
   formatting the social media post based upon the type of the social media post to generate a formatted version of the social media post, wherein the type of the social media post is associated with a first social media platform and a second type of a second social media post is associated with a second social media platform, wherein formatting based upon the type of the social media post is different than formatting based upon the second type of the second social media post; and
generating a first slide of the plurality of slides comprising the formatted version of the social media post.

4. The method of claim 1, wherein a text segment of the plurality of text segments comprises a quote, wherein the generating the presentation comprises:
analyzing the text of the article to determine an entity associated with the quote;
analyzing a content items database to identify a content item associated with the entity; and
generating a first slide of the plurality of slides based upon the quote and the content item, wherein the first slide comprises a representation of the quote and a representation of the content item.

5. The method of claim 1, wherein a text segment of the plurality of text segments comprises a quote, wherein the generating the presentation comprises:
identifying a video associated with the quote;
determining a transcript associated with the video;
analyzing the transcript to identify a timespan of the video corresponding to the quote;
extracting a video segment of the video based upon the timespan; and
generating a first slide of the plurality of slides based upon the quote and the video segment, wherein the first slide comprises a representation of the quote and a representation of the video segment corresponding to the quote.

6. The method of claim 1, wherein the generating the presentation comprises:
identifying a set of entities associated with a first text segment of the plurality of text segments;
analyzing information associated with the content items to identify a content item of the content items associated with the set of entities; and
generating a first slide of the plurality of slides based upon the first text segment and the content item, wherein the first slide comprises a representation of the first text segment and a representation of the content item, wherein the content item comprises at least one of an image of the one or more images or a video of the one or more videos.

7. The method of claim 1, wherein the generating the one or more settings comprises generating the motion settings associated with the presentation based upon the analysis of the article.

8. The method of claim 1, wherein the controlling the second graphical user interface of the second client device to display the edited presentation comprises:
displaying a first slide of the edited presentation;
receiving a first input via the second graphical user interface of the second client device; and
responsive to receiving the first input, controlling the second graphical user interface of the second client device to display a second slide of the edited presentation.

9. The method of claim 1, wherein the generating the one or more settings comprises generating the maximum timelength of the presentation based upon the analysis of the article.

10. The method of claim 1, wherein the analysis of the article corresponds to a determination of at least one of one or more subjects associated with the article or one or more topics associated with the article.

11. The method of claim 1, wherein the generating the one or more settings comprises generating the zooming characteristics associated with the presentation based upon the analysis of the article.

12. The method of claim 1, comprising:
comparing the presentation with the edited presentation to generate an editing report comprising one or more indications of one or more differences between the presentation and the edited presentation;
receiving a third request to generate a second presentation, wherein the third request comprises an indication of a second article;
extracting second content items from the second article, wherein the second content items comprise at least one of one or more second videos, one or more second images or one or more second social media posts;
analyzing second text of the second article to generate a second plurality of text segments; and
generating the second presentation, comprising a second plurality of slides, based upon the second content items, the second plurality of text segments and the editing report.

13. The method of claim 1, wherein the extracting the content items from the article, the analyzing the text of the article to generate the plurality of text segments and the generating the presentation are performed using one or more computing systems, the method comprising:
comparing the presentation with the edited presentation to generate an editing report comprising one or more indications of one or more differences between the presentation and the edited presentation;
modifying, based upon the editing report, at least one of one or more architectures or one or more training corpora, associated with the one or more computing systems, to generate at least one of one or more modified architectures or one or more modified training corpora;
receiving a third request to generate a second presentation, wherein the third request comprises an indication of a second article;
extracting second content items from the second article, wherein the second content items comprise at least one of one or more second videos, one or more second images or one or more second social media posts;
analyzing second text of the second article to generate a second plurality of text segments; and
generating the second presentation, comprising a second plurality of slides, based upon the second content items and the second plurality of text segments, wherein at least one of the extracting the second content items from the second article, the analyzing the second text of the second article to generate the second plurality of text segments or the generating the second presentation are performed using at least one of the one or more modified architectures or the one or more modified training corpora.

14. The method of claim 1, wherein the generating the one or more settings comprises determining one or more colors associated with the presentation based upon the analysis of the article.

15. A computing device comprising:
a processor; and
memory comprising processor-executable instructions that when executed by the processor cause performance of operations, the operations comprising:
selecting an article from one or more article databases;

extracting content items from the article, wherein the content items comprise a social media post;
analyzing text of the article to generate a plurality of text segments;
generating a presentation, comprising a plurality of slides, based upon the content items and the plurality of text segments,
wherein the generating comprises:
  determining a type of the social media post;
  formatting the social media post based upon the type of the social media post to generate a formatted version of the social media post, wherein the type of the social media post is associated with a first social media platform and a second type of a second social media post is associated with a second social media platform, wherein formatting based upon the type of the social media post is different than formatting based upon the second type of the second social media post; and
  generating a first slide of the plurality of slides comprising the formatted version of the social media post;
controlling a first graphical user interface of a first client device to display a presentation editing interface comprising a representation of the presentation;
receiving one or more inputs via the presentation editing interface corresponding to one or more edits to the presentation;
generating an edited presentation based upon the one or more inputs;
receiving a request from a second client device to present the edited presentation; and
controlling a second graphical user interface of the second client device to display the edited presentation.

16. The computing device of claim 15, the operations comprising:
determining an amount of activity associated with the article, wherein the selecting the article is performed based upon a determination that the amount of activity is higher than an activity threshold.

17. A non-transitory machine readable medium having stored thereon processor-executable instructions that when executed cause performance of operations, the operations comprising:
extracting content items from an article, wherein the content items comprise at least one of one or more videos, one or more images or one or more social media posts;
analyzing text of the article to generate a plurality of text segments;
generating a presentation, comprising a plurality of slides, based upon the content items and the plurality of text segments;
receiving a request from a client device to present the presentation;
controlling a graphical user interface of the client device to display the presentation; and
at least one of:
  performing first operations comprising:
    determining an amount of activity associated with the article; and
    selecting the article based upon a determination that the amount of activity is higher than an activity threshold;
  performing second operations comprising:
    controlling a first graphical user interface of a first client device to display a presentation editing interface comprising a representation of the presentation;
    receiving one or more inputs via the presentation editing interface corresponding to one or more edits to the presentation;
    generating an edited presentation based upon the one or more inputs;
    comparing the presentation with the edited presentation to generate an editing report comprising one or more indications of one or more differences between the presentation and the edited presentation;
    receiving a second request to generate a second presentation, wherein the second request comprises an indication of a second article;
    extracting second content items from the second article, wherein the second content items comprise at least one of one or more second videos, one or more second images or one or more second social media posts;
    analyzing second text of the second article to generate a second plurality of text segments; and
    generating the second presentation, comprising a second plurality of slides, based upon the second content items, the second plurality of text segments and the editing report; or
  performing third operations comprising:
    controlling the first graphical user interface of the first client device to display the presentation editing interface comprising the representation of the presentation;
    receiving the one or more inputs via the presentation editing interface corresponding to the one or more edits to the presentation;
    generating the edited presentation based upon the one or more inputs;
    comparing the presentation with the edited presentation to generate the editing report comprising the one or more indications of the one or more differences between the presentation and the edited presentation;
    modifying, based upon the editing report, at least one of one or more architectures or one or more training corpora, associated with one or more computing systems, to generate at least one of one or more modified architectures or one or more modified training corpora;
    receiving a third request to generate a third presentation, wherein the third request comprises an indication of a third article;
    extracting third content items from the third article, wherein the third content items comprise at least one of one or more third videos, one or more third images or one or more third social media posts;
    analyzing third text of the third article to generate a third plurality of text segments; and
    generating the third presentation, comprising a third plurality of slides, based upon the third content items and the third plurality of text segments, wherein at least one of the extracting the third content items from the third article, the analyzing the third text of the third article to generate the third plurality of text segments or the generating the third presentation are performed using at least one of the one or more modified architectures or the one or more modified training corpora.

18. The non-transitory machine readable medium of claim 17, wherein the generating the presentation comprises:

analyzing a first text segment, of the plurality of text segments, to identify a set of entities;

analyzing a content items database to identify a content item associated with the set of entities; and generating a first slide of the plurality of slides based upon the first text segment and the content item, wherein the first slide comprises a representation of the first text segment and a representation of the content item.

19. The non-transitory machine readable medium of claim 17, wherein the content items comprise a social media post, wherein the generating the presentation comprises:

determining a type of the social media post;

formatting the social media post based upon the type of the social media post to generate a formatted version of the social media post; and generating a first slide of the plurality of slides comprising the formatted version of the social media post.

20. The non-transitory machine readable medium of claim 17, wherein a text segment of the plurality of text segments comprises a quote, wherein the generating the presentation comprises:

analyzing the text of the article to determine an entity associated with the quote;

analyzing a content items database to identify a content item associated with the entity; and generating a first slide of the plurality of slides based upon the quote and the content item, wherein the first slide comprises a representation of the quote and a representation of the content item.

* * * * *